(12) United States Patent
Tillotson, Jr.

(10) Patent No.: US 10,547,125 B2
(45) Date of Patent: Jan. 28, 2020

(54) INSULATION DISPLACEMENT TERMINATION (IDT) FOR APPLYING MULTIPLE ELECTRICAL WIRE GAUGE SIZES SIMULTANEOUSLY OR INDIVIDUALLY TO ELECTRICAL CONNECTORS, STAMPED AND FORMED STRIP TERMINAL PRODUCTS, AND ASSEMBLY FIXTURES THEREOF

(71) Applicant: John D Tillotson, Jr., Scottsdale, AZ (US)

(72) Inventor: John D Tillotson, Jr., Scottsdale, AZ (US)

(*) Notice: Subject to any disclaimer, the term of this patent is extended or adjusted under 35 U.S.C. 154(b) by 0 days.

(21) Appl. No.: 16/516,672

(22) Filed: Jul. 19, 2019

(65) Prior Publication Data
US 2020/0006868 A1 Jan. 2, 2020

Related U.S. Application Data

(63) Continuation-in-part of application No. 16/022,496, filed on Jun. 28, 2018, now abandoned.

(51) Int. Cl.
| | |
|---|---|
| *H01R 4/2433* | (2018.01) |
| *H01R 13/506* | (2006.01) |
| *H01R 4/2466* | (2018.01) |
| *H01B 7/00* | (2006.01) |
| *B60R 16/02* | (2006.01) |
| *H01R 4/2454* | (2018.01) |

(52) U.S. Cl.
CPC ....... *H01R 4/2433* (2013.01); *B60R 16/0207* (2013.01); *H01B 7/0045* (2013.01); *H01R 4/2454* (2013.01); *H01R 4/2466* (2013.01); *H01R 13/506* (2013.01)

(58) Field of Classification Search
CPC .. H01R 4/2433; H01R 4/2454; H01B 7/0045; B60R 16/0207
See application file for complete search history.

(56) References Cited

U.S. PATENT DOCUMENTS

| | | | |
|---|---|---|---|
| 3,867,005 A | 2/1975 | Hoppe | |
| 4,083,615 A * | 4/1978 | Volinskie | H01R 12/675 439/402 |
| 4,243,288 A * | 1/1981 | Lucius | H01R 13/506 439/399 |
| 4,346,955 A * | 8/1982 | Chesnais | H01R 4/2445 439/407 |

(Continued)

*Primary Examiner* — Michael C Zarroli

(57) ABSTRACT

An insulation displacement connector (IDC) includes clamping terminals or contacts which make two redundant contacts into the wires instated into them. The inventive contact comprises a flat strip section, four J-shaped cantilevers each having a straight section and an arcuate section, with a portion of each of said straight section attached to the flat strip section, and the cantilevers arranged into two pairs each having two arcuate sections curving towards each other to form a pincer section. The two pincer pairs face toward each other on the strip. A wire received into both pincer pairs is held securely because any tension applied to the wire forced at least one pincer set to clamp together harder on the wire. The inventive contacts reside in an insulator housing of an insulation displacement terminal (IDT) connector assembly which can accept wires of mixed sizes.

15 Claims, 12 Drawing Sheets

(56) References Cited

U.S. PATENT DOCUMENTS

| | | | |
|---|---|---|---|
| 4,385,794 A | 5/1983 | Lucius | |
| 4,648,679 A | 3/1987 | Pelczarski | |
| 4,940,425 A | 7/1990 | Hass et al. | |
| 5,601,447 A * | 2/1997 | Reed | H01R 13/6463 439/404 |
| 5,762,518 A * | 6/1998 | Tanigawa | H01R 4/2412 439/409 |
| 5,890,924 A | 4/1999 | Endo et al. | |
| 5,911,594 A * | 6/1999 | Baker | H01R 13/6463 439/404 |
| 6,165,012 A * | 12/2000 | Abe | H01R 4/2433 439/465 |
| 6,176,745 B1 * | 1/2001 | Furutani | H01R 13/506 439/701 |
| 7,004,797 B2 * | 2/2006 | Harada | H01R 4/185 439/852 |
| 7,271,162 B2 * | 9/2007 | Sabb | C07D 487/06 514/219 |
| 7,955,116 B2 | 6/2011 | Bishop | |
| 9,136,641 B2 * | 9/2015 | Bishop | H01R 4/4836 |
| 9,543,665 B2 | 1/2017 | Sabo | |

\* cited by examiner

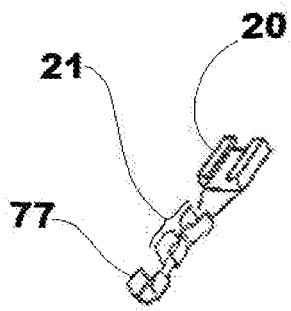
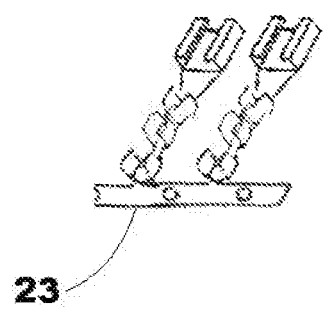
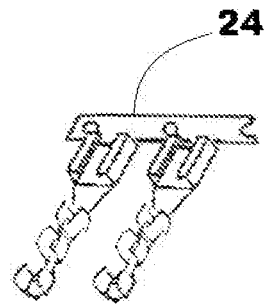
Fig. 2a     Fig. 2b     Fig. 2c
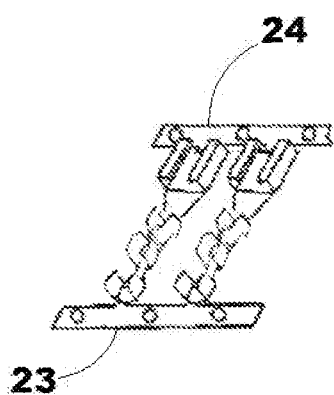
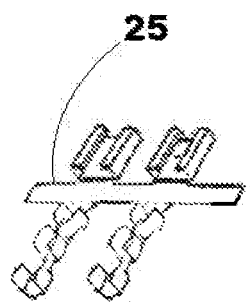
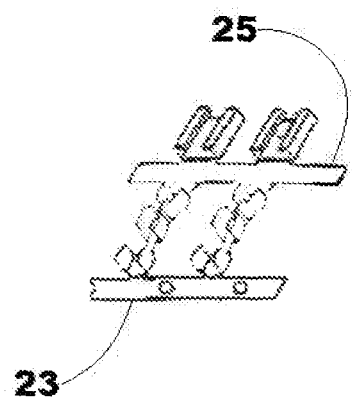
Fig. 2d     Fig. 2e     Fig. 2f
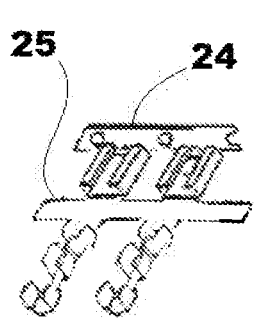
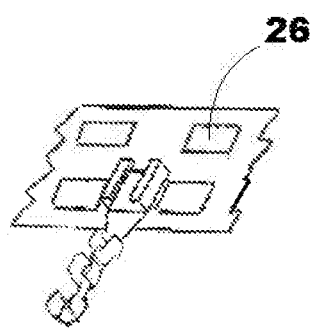
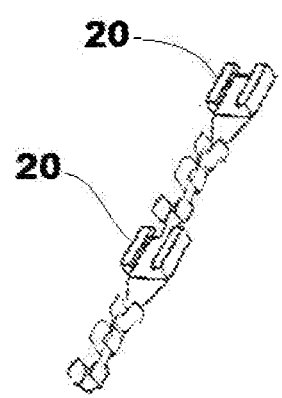
Fig. 2g     Fig. 2h     Fig. 2i

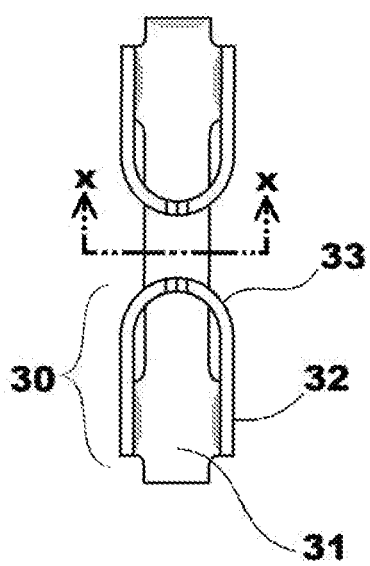
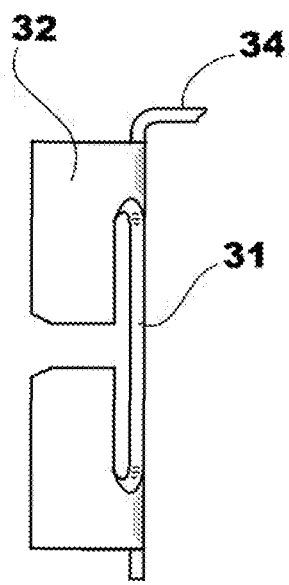
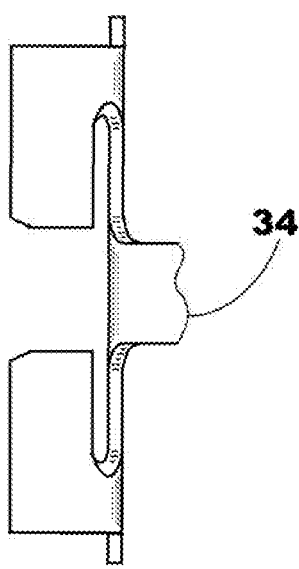
Fig. 3a    Fig. 3b    Fig. 3c
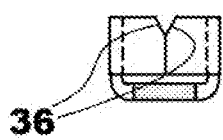
Fig. 3d
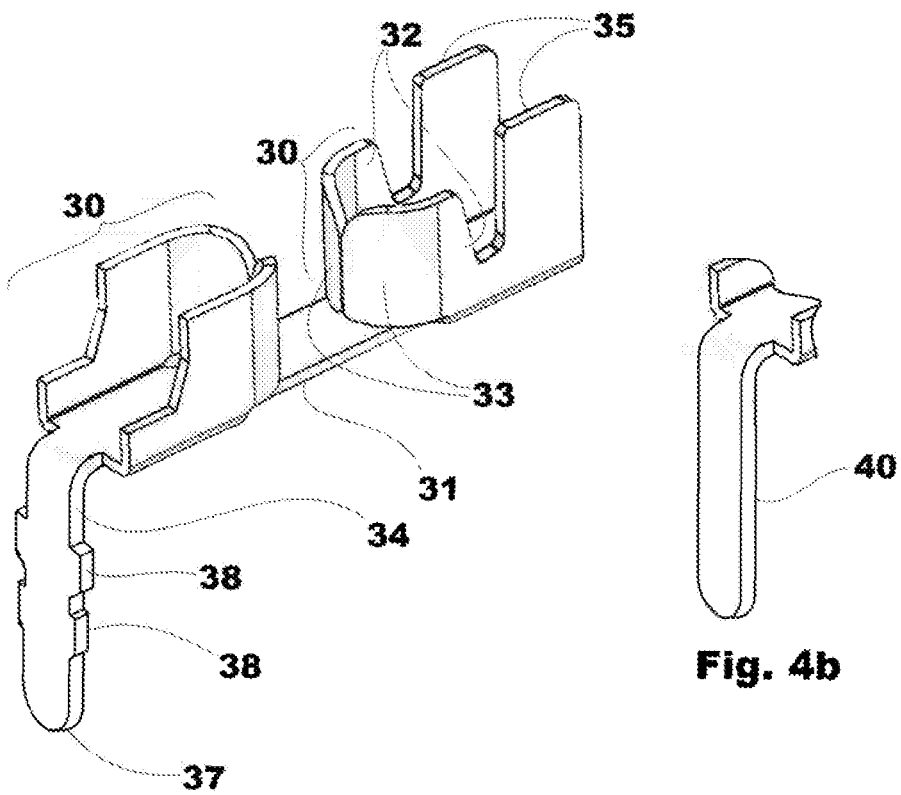
Fig. 4a    Fig. 4b

INSULATION DISPLACEMENT TERMINATION (IDT) FOR APPLYING MULTIPLE ELECTRICAL WIRE GAUGE SIZES SIMULTANEOUSLY OR INDIVIDUALLY TO ELECTRICAL CONNECTORS, STAMPED AND FORMED STRIP TERMINAL PRODUCTS, AND ASSEMBLY FIXTURES THEREOF

PRIORITY: CROSS-REFERENCE TO THE RELATED APPLICATION

This non-provisional utility patent application is a continuation in part of U.S. non-provisional utility patent application "Insulation Displacement Termination (IDT) For Mass Termination of Multiple Electrical Wire Gauge Sizes And In Termination Of Multiple Wire Gauge Sizes to Strip Terminal Products," Ser. No. 16/022,496, filed Jun. 28, 2018 and currently pending, which in turn claims the benefit of and priority to U.S. provisional patent application 62/532,352 "Insulation Displacement Termination (IDT) Design for Mass Termination of Multiple Electrical Wire Gauge Sizes in IDT Multiple Position Electrical Connector Products," filed Jul. 13, 2017.

This application also claims the benefit of and priority to U.S. non-provisional utility patent application "Discrete Wire Harness Single or Dual Operator Work Center," Ser. No. 16/133,466, filed Sep. 17, 2018 and currently pending.

Application Ser. No. 16/133,466 is also continuation in part of application Ser. No. 16/022,496 currently pending, and also claims the benefit of and priority to U.S. provisional patent application 62/559,934 "Discrete Wire Harness Single/Dual Operator Work Center," filed Sep. 18, 2017.

The entire contents of U.S. provisional patent application 62/532,352 "Insulation Displacement Termination (IDT) Design for Mass Termination of Multiple Electrical Wire Gauge Sizes in IDT Multiple Position Electrical Connector Products," filed Jul. 13, 2017, is hereby incorporated into this application document by reference.

The entire contents of U.S. provisional patent application 62/559,934 "Discrete Wire Harness Single/Dual Operator Work Center," filed Sep. 18, 2017 is hereby incorporated into this application document by reference.

The entire contents U.S. non-provisional utility patent application "Insulation Displacement Termination (IDT) For Mass Termination of Multiple Electrical Wire Gauge Sizes And In Termination Of Multiple Wire Gauge Sizes to Strip Terminal Products," Ser. No. 16/022,496, filed Jun. 28, 2018 is hereby incorporated into this application document by reference.

The entire contents of U.S. non-provisional utility patent application "Discrete Wire Harness Single or Dual Operator Work Center," Ser. No. 16/133,466, filed Sep. 17, 2018 is hereby incorporated into this application document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever

FIELD

The invention generally relates to wire harness termination of multiple wires in a multiple position connector securely connecting sets of wires having more than one gauge size and in the termination of single terminals that are manufactured in continuous strip form from high speed progressive die apparatus.

BACKGROUND OF THE INVENTION

Insulation Displacement Termination (IDT) connectors allow mass termination of multiple wires in a multiple position connector product. By having terminals which cut through a wire jacket to make an electrical contact with the central solid conductor or group of strands in a wire, IDT connectors eliminate any required preparation of the wire end before the wire gets attached to the connector. IDT connectors in wire harnesses eliminate many wire assembly tasks such as insulation stripping, crimping to individual terminals or contacts, or soldering. IDT connectors are especially convenient for terminating wires which have been grouped in advance or manufactured as a unitary group, such as ribbon cable.

IDT connectors for typical cable harnesses are designed with an insulator housing holding one or more linear arrays of IDT terminals, and a backing plate or clip. The wires are lain en masse over their proper terminals and the backing plate (if included in the design) is positioned above the wires to form a sandwich. A press operation crushes the sandwich together and the backing plate forces the wires to become impaled upon the IDT terminals. The terminals pierce the wire insulator material, and encounter the central metal conductors. Common conductor materials include copper, aluminum, and brass and bronze alloys. Precious metals such as gold silver and platinum are also used but much more rarely. Thus most metal conductors received into wire harness cable end connectors will be non-precious metals which have accrued an external oxide film from contact with Earth atmosphere at some point in the wire manufacturing process.

For the best electrical interconnection, the oxide films on the wire strands and on the terminals must be displaced to expose fresh metal and to forge fresh metal to fresh metal contacts. This displacement may occur by scraping of the wire by the terminal during the crush process, or by deformation of the wire strands so that the oxide coating is stretched apart and fragmented to reveal fresh metal underneath. Yet even after a successful electrical interconnection is made, a minimum crushing force must be maintained over the life of the wire harness. Oxide films will grow on exposed fresh metal at the contact interface and may propagate over time to wedge apart previously bonded conductors, resulting in increased contact resistance, performance decay, loss of signal integrity, electrical noise, and intermittent interruption of electricity intended to pass through to the device to which the cable is attached.

Thus during and after assembly, sufficient pinching force must be developed and maintained by each IDT terminal to create and preserve "gas tight" metal to metal contact and durable and reliable electrical performance. Many previous designs fail to maintain good pinching force over a service lifetime, especially in applications where vibrations or thermal or mechanical shock cause individual conductive strands to drift from their originally installed positions.

Wire harnesses are also often used to electrically interconnect two pieces of equipment that move with respect to each other, or which are subject to mechanical shock or vibration, or temperature extremes or thermal shocks. In these and other application environments, IDT connectors must also resist a wire being pulled out of a terminal.

It is sometimes desired to supply an electrical device with high power to some of its subassemblies and low power to others. A common arrangement supplies a small number of larger, heavy-duty wires for motive power, solenoids, or heating, while a larger number of smaller, finer wires or ribbon cable is used for parallel data, digital signaling or digital control of the device. Some devices may require several intermediate sizes of wiring.

Conventional IDT designs allow only for connecting multiple wires of only one common wire gauge size, i.e, the same wire size, at a time. A common design for IDT contacts is the tuning-fork contact which has a pair of blades united at their base, so that an insulated wire inserted between the blades gets its insulation skived off (or pared off) on both sides. The gap between the two blades of the tuning fork forms a deep "V" which forces the conductive strands of a multiple strand wire together to form a plurality of gas-tight interconnections, However, a tuning fork contact of a given size can only successfully grab a narrow range of wire sizes, and if a wide range of wire sizes are to be connected through the same cable end housing, then such the insulator housing must be populated with a contacts of a number of different designs, each capable of handling its own narrow range of wire size, because if an oversize wire is inserted into the typical tuning fork or v-notch contact design, either the tuning fork deflects too much and loses its pinching force due to plastic deformation of its blades, or one or more strands of the inserted wire become cut clean off or shorn during the installation. The result is an unreliable electrical contact susceptible to long term degradation of electrical properties or excessive contact resistance due to an insufficient number of strands having made good electrical bonds with the contact.

The manufacturing of wire harness assemblies is a very labor intensive process is made even more complicated when for multiple wire sizes within a cable harness, each size must use its own dedicated cable end connectors. For example, the spring loaded contacts of U.S. Pat. No. 9,543,665 to Sabo require individual wires to be inserted into keyhole-shaped slots shown in FIG. 2A of that document. Most IDC contact designs use a vertical plate with a slot of a predetermined width, as seen in FIG. 1B and 1C of Sabo. Plates having a slot, or even an effectively serrated slot as in Sabo are best for connecting to solid wire. The initial compression afforded by a vertical plate and slot design deteriorates when multiple-strand wires are inserted. Vibration, tension, and other environmental conditions may allow the individual strands of wire to rearrange themselves over time, causing loss of contact force or pinching force onto these conductive elements, resulting in loss of electrical integrity of the connection.

In addition to being primarily suited only for solid wire connections, each slotted plate design can only handle a narrow range of wire size. Terminating multiple wire sizes into a single connector insulator housing usually requires a mix of contact styles each dedicated to one size or style of wire to be terminated. U.S. Pat. No. 5,890,924 to Endo et al, and U.S. Pat. No. 7,955,116 to Bishop have slotted vertical plate contacts that illustrate these limitations. Also, vertical plate and slot contacts cannot dynamically maintain contact normal force if the internal conductors of a multi-strand wire rearrange themselves in response to initially established pinch forces. This is also a limitation of terminals having two separate, substantially vertical and rigid plates receiving a wire inserted into a slot or gap between these features. An example of such a slot is seen between items 32 and 34 in FIG. 1 of U.S. Pat. No. 4,385,794 to Lucius. The bent plate features act the same as a vertical plate with a vertical slot.

Where several connections must be made at a particular site, the opportunity for error, mis-wiring, or damage increases with the number of attachments to be made. It would be an improvement in labor costs and design simplicity to be able to offer an IDT interconnection system which could handle mixed wire sizes in a single insulator housing of a cable end connector.

Lastly, cable end connector assembly may be simplified if all IDT terminals in a cable end receive their designated wires from a single direction, so that a simple press tool descending from above may be used to successfully and reliable install each wire into its designated terminal in a single operation.

BRIEF SUMMARY OF THE INVENTION

From the aforementioned background it is understood that many objectives exist. A primary objective of the invention is to provide IDT terminals, that is, terminals of a design capable of incising or piercing through wire or cable insulators and making a permanent and reliable electrical connection with the central conductor or conductors in each wire or cable. A corollary objective is that the wires, cable or ribbon cable or the like require only minimal preparation or ideally no preparation before such a connection may be made. For example, stripping of exterior insulators should not be required and preparatory tinning of exposed conductors or capillary induction of solder into trimmed wire ends should not be required. Another corollary objective is that a good electrical connection may be established without requiring treatments to the wires for removal of oxide films or corrosion products accrued during typical storage environments or handling conditions to be reasonably expected in the cable harness assembly industry.

Another objective of the invention is that each insulation displacement connection thus made remains electrically reliable over a reasonable service life in an environment of temperature extremes and fluctuations, mechanical shocks and vibration, and typical levels of corrosiveness found in atmosphere, industrial environments, or other reasonably foreseeable environmental conditions. A corollary objective is that the insulation displacement terminal may retain a connected wire or cable while resisting reasonable levels of tension, bending, and twisting forces. The terminal should resist pull-out of a connected or inserted wire.

Another objective of the invention is to provide a capability of connecting to sets of mixed wire gauge sizes in one IDT mass termination operation. This capability would provide multiple opportunities for lowering the cost of wire harness assembly manufacturing, such as by shortened production time, reduced in-process inventory time, reduced scrap, and to produce completed assemblies in the smallest manufacturing space possible. By replacing a design having several connectors each having their own narrow range of wire size with a smaller number of connectors each handling a large mix of wire sizes or even consolidating into a single mixed-size connector, assembly complexity and opportunities for error or damage are reduced.

Furthermore, the necessity of populating a number of different contact designs into a single cable end insulator housing brings with it excess costs and complexities of managing a plurality of contact designs as discrete part numbers and ensuring that for each connector head shell, the right contacts are positioned at their correct sites and the correct wires are installed into their designated contacts.

It would be preferable if a single contact design could handle the full range of wire sizes to be installed into a connector insulator housing, because of the simplifications and savings available by reducing the number of different part numbers in each connector cable end assembly. Especially in the automotive industry, the regulatory and documentary burdens of quality control to the lot and batch level for each part number in control may be reduced. Great savings of time, repeated validation testing, traceability and statistical process control records may be reduced by reducing the number of part numbers called out in a particular assembly. Thus it is an additional objective of the invention to provide a single contact design capable of handling the widest range of wire sizes possible.

Yet another object of the invention is to provide a connector assembly fixture which an assembly worker may use, which assists in aligning an array of terminals for receiving wires which will be connected to them, and a corollary objective of the invention is to provide a fixture which enables electrical testing and verification of such an array of terminals before these are permanently installed into a connector insulator housing of a cable or wire harness assembly, so that corrective actions such as a rework or replacement of a defective element within the array as identified by test may be done at a point in an assembly process when it is less costly.

Various devices are currently available which attempt to address these challenges, although they may at best meet only one or two aspects of the totality of the requirements.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

FIGS. 2a through 2i show common types of terminal carrier strips or pilot strips used to furnish a series of terminals for assembly onto the end of a wire.

FIGS. 3a through 3d show the features of the inventive IDT wire pincer, with FIG. 3d being a cross-section taken at a section line x-x defined in FIG. 3a.

FIGS. 4a through 4d show optional board-stake and solder tail embodiments of the IDT wire pincer terminal all in accordance with the invention.

DETAILED DESCRIPTION OF THE INVENTION

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification, the term "means for . . . ." as used herein including the claims, is to be interpreted according to 35 USC 112 paragraph 6.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Also in this specification the word "wire" may be used interchangeably with the word "cable" when meaning a single strand structure comprising a solid or a stranded central conductor surrounded by an insulating coating or a jacket. A "wire" in this specification may have a solid central conductor or a braided or served strand built up from a plurality of solid conductors. Some wires have a built-up core of multiple conductors, with each individually coated a solder or a brazing material which is heated to bond the group to act as a unitary conductor. "Ribbon cable" is comprised of a linear array of individual wires having conjoined insulators to form a flat membrane or strip.

Figure 1:
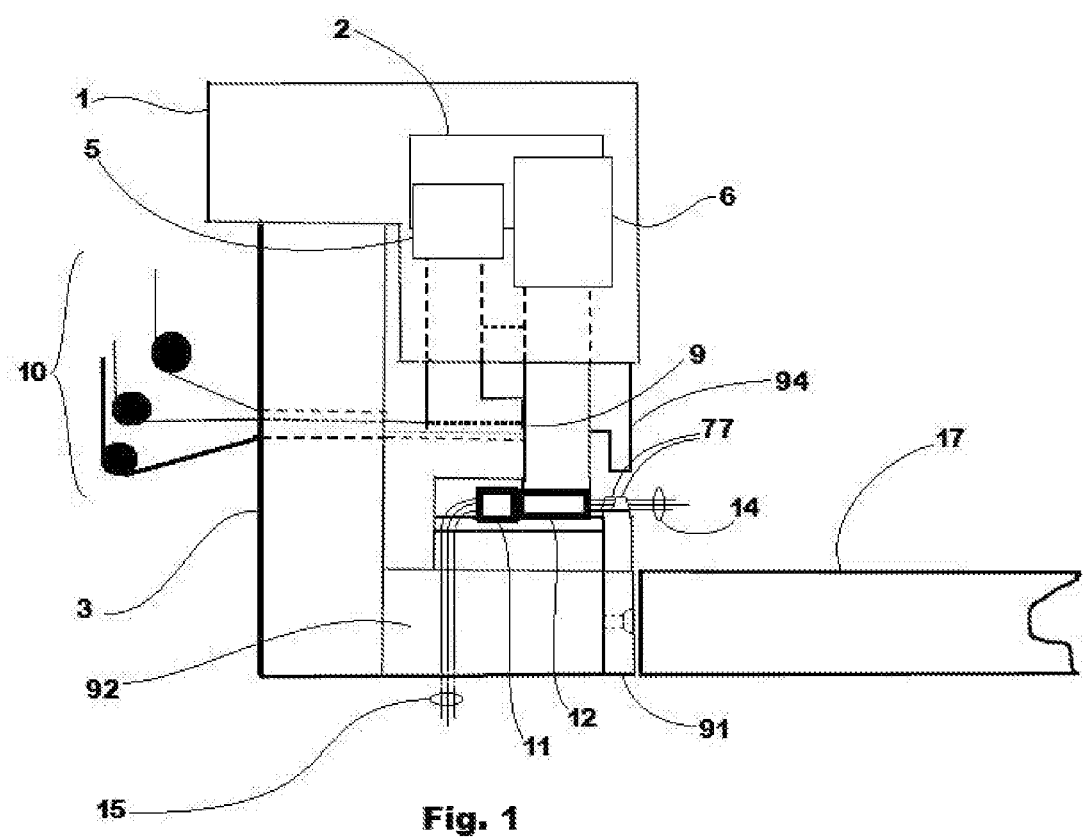
FIG. 1 shows a typical IDT terminator applicator machine [1] in its context of a wire harness manufacturing station.

FIG. 1 shows a typical IDT terminator applicator machine [1] in its context of a wire harness manufacturing station. The machine includes a motor [2] typically including or operatively connected to a flywheel or other rotating mass which stores and provides rotational inertia during an operating cycle.

Application tooling specific for the cable to be made provides an intermittent wire holding and feeding system [5] and specific tooling [6] to "wire cut and stuff" flying leads, braided cable, ribbon cable or other forms of electrical conductors typically provided in bulk spools. Connector contacts or terminals may also be provided in bulk spools.

Spools of bulk wires of various gauges and colors, or fairlead pulleys [10] guiding wire from bulk storage spools, skeins, or boxes are passed through a side wall [3] or back wall of the machine. Because cutting, trimming and terminating operations often fling clipped wire ends and other debris at random, the side wall or back wall helps confine such debris to the vicinity of the assembly station and prevents foreign matter from contaminating the bulk cable sources.

The application tooling mounted on the side wall shown is designed for mass terminating wires [10] after a manual multiple of these wires which are individually dressed around form board pins located on form board [17] to their end location positions (not shown.) The mass termination cycle in this figure will initiate when all wires pulled through wall [3] have reached their final end positions. Mass termination means a single action of a machine or tool operates upon a plurality of wires to cause them to be simultaneously attached and electrically mated to a complementary set of terminals. Mass termination does not mean making several connections between a single contact and a single wire.

In some machinery designs, a clamping system aligns a set of terminals to an arrangement of wires taken from the bulk supply [10] and in a single action of compression the contacts are electrically bonded to and crimped into their terminals while the wire is simultaneously parted off its bulk supply, leaving a set of trimmed ends [9] available to begin building the other end of the next cable harness [14] to be made. The trimmed ends [9] remain clamped in the shearing tools which effect the cutoff. The previously terminated wires are pressed into an insulator housing of a cable end connector [12] by the excursion or stroke of the machine, and the cycle is repeated for the next cable to be built.

Another labor saving step is to assemble the wires into their cable end connector while it is mated to a complementary connector [11] which holds signal lines [15] so that diagnostic tests may verify that acceptable connections have been made and even test other components incorporated into the cable at this point in the assembly process. For example some cables include in-line active or passive electronic components such as dropping resistors or impedance matching circuits, and these may be energized and analyzed for correct function. Non-conforming material may be detected and excluded from the assembly process for rework, salvage, or scrap.

Also seen in this figure are an anvil tool [91] comprising a series of crimp forming sites which control the rounded underside surface of the crimp wing sections [77] of terminals while the wings are being formed. The anvil tool and the application specific fixture are secured to a rigid base [92] for the assembly and crimping operations. The terminals are formed to shape and securely crimped to the wire jackets when an upper-side tool which is a crimping punch [94] descends upon them while they are supported from below by the crimp-forming sites of the anvil tool. These tools are shown and discussed in further detail in later figures.

Cable terminating tooling as described above is usually located at the periphery of a peg board template or wire harness assembly platform [17] that allows an assembler to pull lengths of wire from bulk sources, arrange the wires and cables into a harness, and then assemble connector terminals and insulator housings onto the various ends of the harness using the terminating tool. As the wires are arranged in a cable end connector housing having IDT contacts, all the wires may be mass terminated in one operation.

FIGS. 2a through 2g show common types of terminal carrier strips or pilot strips used to furnish a series of terminals for assembly onto the end of a wire. The terminal type shown in these figures is a quick-disconnect terminal [20] used in many industries including the automotive industry. The terminal includes an embodiment of the inventive IDT pincer section [21] explained in further detail below. The inventive pincer section is present in all illustrations 2a through 2i. The terminal also has a jacket crimp section [77] which is formed around and compressed onto the insulator or jacket of the wire being terminated. The jacket crimp withstands most if not all pulling forces, to prevent the electrical bond between the wire conductors and the wire crimp from being disturbed or from coming apart.

FIG. 2a shows a loose terminal that includes an embodiment of the inventive IDT pincers.

FIG. 2b shows the terminals carried by a pilot strip [23] which includes uniformly spaced holes.

FIG. 2c shows the terminals carried on a pilot strip [24] by the terminal end.

FIG. 2d shows the terminals carried on a first pilot strip [23] attached at the insulation crimp section of the terminal, and a second pilot strip [24] attached at the terminal end.

FIG. 2e shows the terminals carried by a center carrier strip [25.] Center carrier strips retain and locate terminals and their precision-formed geometries more robustly than tail carriers or terminal-end carriers.

FIG. 2f shows the terminals being carried on a tail carrier [23] and a center carrier [25.]

FIG. 2g shows the terminals being carried on a center carrier [25] and a terminal end carrier [24.]

FIG. 2h shows a terminal detachably affixed to a mylar tape for use in a tape and reel bulk storage and product delivery system.

FIG. 2i shows a strip of terminals [20] connected end to end. This line of terminals may be presented by application tooling to a wire strip and crimp tool which sequentially terminates a plurality of wires for assembly onto spade contacts or insertion into a cable end connector insulator housing.

In summary, FIGS. 2a through 2h represent a female to flat tab interconnect wire to wire application where the termination sections on the strips shown are terminated to wire using conventional application tooling designs, such as high forces applied leveraged hand tools and bench tooling press equipment.

FIGS. 3a through 3d show the features of the inventive IDT wire pincer, with FIG. 3d being a cross-section taken at a section line x-x defined in FIG. 3a. FIG. 3a shows a top view of the inventive IDT contact or terminal. It is an electrical contact comprising a flat strip section [31] and two flexible beam pincers [30,] of which each pincer includes two flexible beams, each disposed on opposite sides of the flat strip section.

Each flexible beam includes a straight section [32] and an arcuate section [33] with a portion of each straight section attached to the flat strip section. The flexible beams are arranged into first and second pairs to form pincers, with each pincer having its two arcuate sections curving towards each other to abut at their tips under a preload and form a closed slot openable for receiving and retaining a wire inserted therein. The two flexible beams are spring-like cantilevers which preferable apply equal opposing forces that are subject to variations in wire core diameters.

In this specification, "flexible beams" mean elastically deformable members which exert a restoring force when deflected from an initial or neutral position and which will return to the initial or neutral position once a disturbing force or displacement is removed. The term does not include plastically deformable elements such as crimp wings or other elements which are permanently bent or crushed as part of permanently attaching a wire to a contact or terminal. Thus the "wings" of U.S. Pat. No. 4,940,425 to Hass et al (hereafter "Hass,") column 3 line 13 are unrelated to the flexible beams of the inventive contact, because in Hass these are permanently deformed away from the electrical contact interface to serve as wire jacket crimps.

FIG. 3b is a side view projected from the view of FIG. 3a, and it is not explicitly aligned with FIG. 3a. In this view it is seen that a portion of straight section [32] of a flexible beam of a pincer is attached to the flat strip section [31.] The flat strip continues past the pincer to form a board-stake or solder-tail feature [34] which is broken off in this view.

Feature [34] as a board-stake is usually used to press-fit into a plated through-hole of a printed circuit board (PCA.) A good electrical bond may be made without soldering the stake into the plated hole. Solder tails are used to bond a contact or terminal to a land or via on the surface of a PCA. To prevent rocking and breaking off of board-stake or solder tail contacts, a contact may have a plurality of these to anchor it securely to the PCA which also advantageously increases the current carrying capacity and mechanical robustness of the joint. In FIG. 3c this board-stake [34] originates at the side of the center strip at a point between the two pincers of the inventive IDT contact.

FIG. 3d is a cross-section view of the inventive IDT terminal design taken at the section line x-x shown in FIG. 3a. In this view it is seen that both tips of the arcuate sections of the flexible beams which form the pincer are formed so as to touch and pinch closed. In the embodiment shown, the arcuate sections of both flexible beams have tips with chamfered edges [36,] but it is also within the scope of the invention for the tips to have a rounded edge. These features, whether a chamfer or a fillet, form a notched lead-in for a jacketed wire being inserted from above down into region where the tips of the arcuate portions of the flexible beams touch along their distal edges.

Figure 4B:
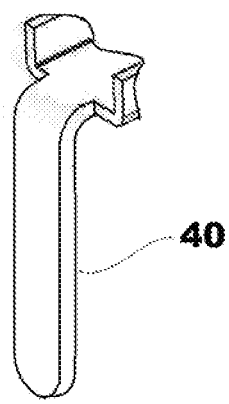
Figure 5A:
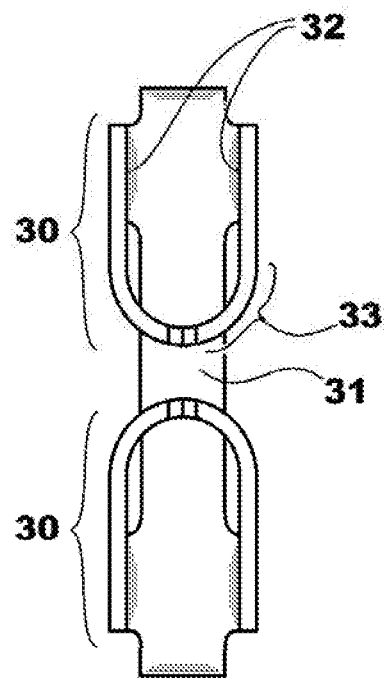
FIGS. 5a and 5b show a top and side view of an alternate embodiment of the inventive IDT wire pincer terminal section of a contact or terminal.
Figure 5B:
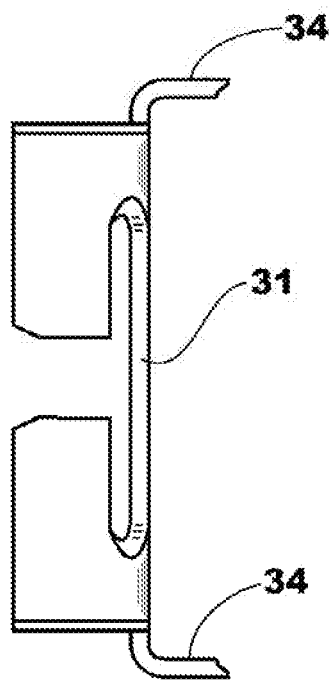
Figure 10:
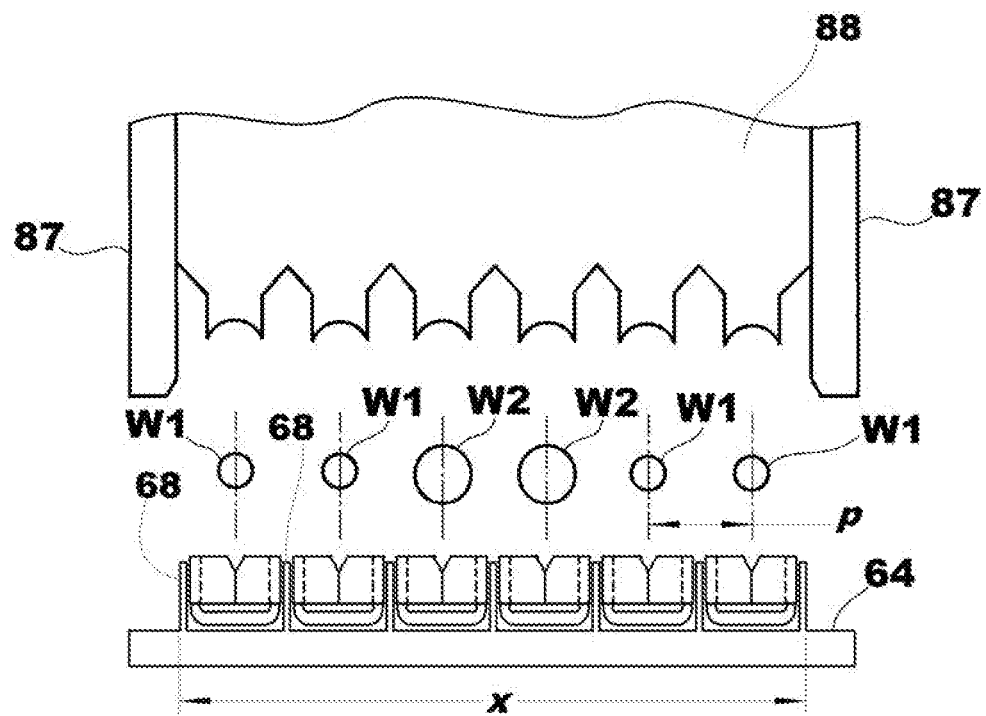
FIG. 10 shows an IDT insertion tool for terminating wires to contacts in accordance with the invention.
Figure 12:
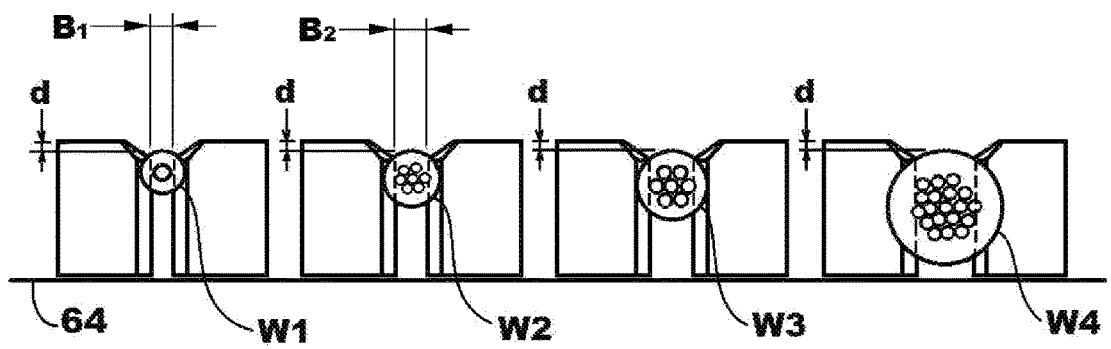
FIG. 12 shows a set of the inventive IDT wire terminals, all of the same size, but each receiving and connecting to a wire of a different size.

Notched lead-ins are also seen in FIGS. 4a, 5b (in profile,) FIG. 10 and FIG. 12. Preferably, the arcuate sections of the flexible beams are formed with a predetermined over-bend so that at their meeting edges a pinching preload exists. Downward movement of the jacketed wire transverse to and between the closed edges of the mutually opposed flexible beam tips spreads them apart, to which they react by generating increased pinching force.

The pinching force impinging on the wire jacket by means of a sharp edge, or the natural surface roughness and the serrated profile of the as-stamped or as-coined edge plus the relative movement of these edges and surfaces with respect to the jacket allow the beam tips to lacerate the wire jacket and expose its interior metal conductors.

The minimal contact area of the pincer tip edges concentrate the pinching force engineered by the preload, making electrical bonds between the terminal material and the conductors inside the wire and also crushing and swaging together the conductors caught in the pinch, thus achieving the previously explained benefits of deforming oxide-coated metals to expose new surfaces and immediately form gas-tight bonds among the wire conductors held at the pinch point and the bonds of the flexible beam tips which have bitten through the jacket, wiped away oxide films on the wire conductors, and maintain these bonds over the life of the terminal by means of these pinching forces.

FIGS. 4a through 4d show optional board-stake and solder tail embodiments of the IDT flexible beam pincer terminal all in accordance with the invention. As seen in FIG. 4a, the IDT portion of these types of terminals comprises two pincers, each formed by a pair of flexible beams. Each pincer [30] has a straight section [32] and an arcuate section [33.] A portion of the straight section is attached to a flat strip section [31] of the terminal. A pair of substantially symmetrical flexible beams with their arcuate tips curving towards each other form a "pincer" of the invention, and sufficient curvature of the arcuate sections of the flexible beams is preferred so that their tips, which may include coined edges, abut closed with a preload pinching force.

Although a pincer made of a pair of substantially symmetrical flexible beams is a preferred embodiment, asymmetrical pincer designs are also within the scope of the invention, such as would bias an inserted wire to a preferred side of a terminal if such asymmetry is desired.

Spaced apart from or aft of the straight section of the pincer, a pair of crimp ears [35] are provided to be used to crimp down upon the wire jacket and take up some or most of any unwanted mechanical forces applied to the wire, such as from tension, shock vibration, or thermal stresses. A crimp made onto the jacket at a point removed from the electrical bonds made by the terminal pincers of the invention also helps prevent twisting forces (torques) or angular displacement or other physical disturbance to the gas-tight connections made by the pincers, thus protecting the electrical integrity of the connection over the life of the devices wherein it is used.

A crimp operation requires considerable crushing force delivered repeatably and reliably. A typical crimp operation for a terminal of the design shown in FIG. 2a requires about 85 ksi of compression force from above, which will determine the pounds force required based on the area or number of mated lines being terminated. As a further example, the Bishop invention requires special hand tools (FIGS. 4A, 4B, 4C of '116,) to concentrate insertion force on the wires being terminated while carefully avoiding delicate terminal structures.

However, using pincer IDT terminals of the invention, wire insertion and termination may be achieved using less than 2½ pounds force per mated line. This reduced force requirement enables a new assembly method discussed further below. Tensile tests and other wire retention tests showed improved mechanical retention.

FIG. 4a also shows contact with a tail [34] designed for insertion into a plated through hole of a printed circuit board (PCB.) The tail has a rounded or to give tip [37] and one or more pairs of barbs [38] extending laterally from the axial direction of the tail to provide lead-in and initial centering as the contact is pressed into the hole. A trapezoidal lead-in also resides within the scope of the invention. Barbs further up on the contact tail extend wider than preceding barbs to present a progressively expanding engagement with the conductive plating inside the hole. Oxide films on the plating and on the contact are wiped or skived away during insertion, so that a reliable electrical bond is achieved.

FIG. 4b shows a different kind of tail portion [40] which may extend from the inventive pincer IDT contact, having no barbs. This contact is soldered into a plated through hole and so the barbs of the previous design are omitted. FIG. 4c shows a contact tail [41] designed for anchoring the inventive contact onto a land, or a plated surface on a PCB. Soldering of the contact to its land may be accomplished manually or by machine, or by various reflow techniques known in the PCB assembly industry.

Figure 4D:
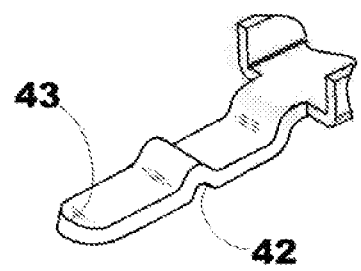
Figure 4C:
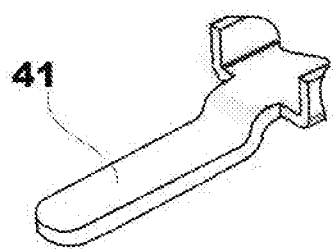

FIG. 4d shows a solder tail with improved adhesion to a land. The tail includes a hump section [42] and a raised end [43] resembling a ski tip. While solder is molten, these features draw in additional amounts by capillary action and surface tension effects of the melt. Besides the fillet of solder which collects around the periphery of this tail design, more solder is wicked under the hump and collects under the raised end, substantially increasing adhesion strength and resistance to tension or twisting in the wire inserted into the inventive IDT section of the contact.

Figure 4E:
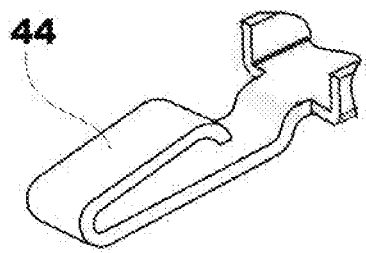
FIG. 4e shows a leaf spring contact incorporating the inventive IDT wire pincer terminal section.

FIG. 4e shows a leaf spring portion [44] of a terminal in accordance with the invention. Leaf spring contacts are used to pass electrical power or signals when a movable and conductive object is positioned over the leaf spring. Typical applications include interlock systems where a cover, lid, hood, or a safety screen must be closed in order for other powered equipment to operate safely. If the cover of safety screen is opened during operation of the equipment, loss of continuity is used to effect a shutdown of the equipment until a safe condition is restored. Other applications include delivering power to exchangeable or replaceable modules each having power pick-up contacts in a common location. Affixing a new module into place engages its contacts with the leaf spring terminals, allowing the module to be energized.

FIGS. 5a and 5b show a top and side view of an alternate embodiment of the inventive IDT flexible beam pincer terminal section of a contact or terminal. In FIG. 5a, four flexible beams are paired off to form two wire pincers [30] emerging from a flat center strip section [31.] The arcuate sections [33] of each pair of flexible beams in each pincer curve towards each other and touch at their tips. By overbending the curved tips, a pinching preload may be established when the flexible beams are formed closed. A portion of the straight section [32] is attached to the flat center strip section of the terminal.

Because each pincer is formed by two flexible beams each having a straight section and an arcuate section, the pincer defines a "front" where the tips of the two arcuate sections of the flexible beams meet, and a "back" where the straight sections are attached to the flat strip section. Thus the two pincers of the terminal of FIG. 5a are oriented front to front, or "facing each other," because the arcuate sections of the first pair of flexible beams face towards the arcuate sections of the second pair of flexible beams. The "facing directions" of pincers in accordance with the invention are shown and explained in FIGS. 5e through 5g.

Specifically, a direction parallel to the flat strip section and proceeding from the straight sections of the cantilever beams towards their tips defines a "facing direction." The pairs of pincers seen in FIGS. 3a, 4a, 5a, 5c, 5d, all face each other. Although contact designs having pairs of pincers oriented to face away from each other reside within the scope of the invention, it is preferred to have pairs of pincers facing each other. Also, according to one set of preferred embodiments, the arcuate portions of the two flexible beams of a pincer are concentric and together form a semi-circular arc as seen in this figure.

FIG. 5b shows the flexible beam pincer design of FIG. 5a from the side, with the flat strip section [31] and partial portions of two tails [34] leading out the back end of each pincer section. The flexible beams are arranged into two pairs, a first and a second, with each pair having two arcuate sections curving towards each other to form a pincer. When the pincers face each other and are formed with enough preload and the pincer sections are located close to each other and preferably as close as stamping and forming tooling allow, then the four flexible beams of the two pincers act like a Chinese finger trap. (NB: The phrase "Chinese finger trap" has been allowed in patent specifications as recently issued as U.S. Pat. Nos. 9,970,503, and 9,988,748 and implies no cultural or ethnic disparagement. It is a term used to describe mechanisms whereby axial tensions in a longitudinal member such as a wire, rod or finger received in an article produce radial constrictions of a sheath, or in the case of the inventive contact design, an increase in retention force in response to a tension which would otherwise pull the wire out of the pincers of the contact.)

Figure 5C:
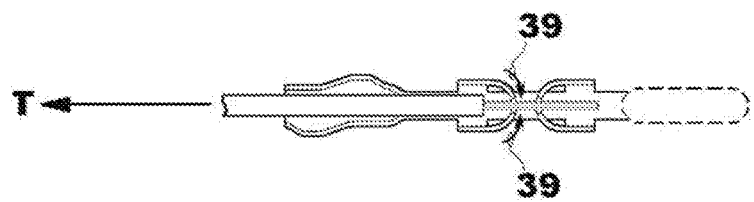
FIGS. 5c and 5d show tension applied to a wire retained in a pincer IDT terminal in accordance with the invention.
Figure 5D:
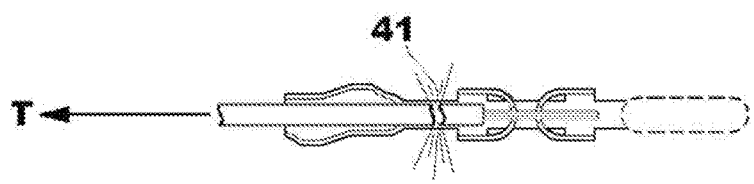

FIGS. 5c and 5d show tension [T] applied to a wire retained in a pincer IDT terminal in accordance with the invention. If the wire retained therein is pulled in either direction, the pincer experiencing the axial tension in the wire as back to front will only relax slightly. The preload of the beams plus the additional pinching load created by the presence of the wire conductors forcing the beams apart will not be overcome by axial tension in the wire alone. However, the same tension also acts on the juxtaposed second wire pincer immediately opposite the first pincer. The edges of the beam tips already engaged to the wire bite into the wire even harder and lock it in place, as indicated by the arrows [39] in FIG. 5c, which illustrate mutually opposed pinching forces in a pair of flexible beams of a pincer of this contact design. This is the "Chinese finger trap" effect, wherein an increase in axial tension in a wire received into both of the flexible beam pincers increases those mutually opposed pinching forces so that the retention force in at least one of the flexible beam pincers equals at least the ultimate tensile strength of the wire. The pincer where these increased mutually opposed pinching forces occur is the one facing away from the axial tension force in the wire.

Another analogy is that the symmetrically opposed flexible beams of a pincer withstanding a front to back tensile load in the wire it is grasping cooperate like the pairs of straight and curved sections of a Gothic arch, and may support substantial compression forces before a buckling load is reached. It is preferable to design the bucking strength of this closed arch structure to exceed the breaking strength of the wire, so that once exceeded the site of a wire break [41 in FIG. 5d] occurs elsewhere than within the IDT connection and preferable outside of a connector insulator housing where it can be noticed and repaired.

Figure 5E:
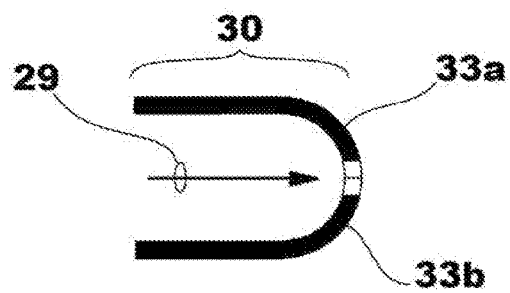
FIG. 5e shows a stylized top view of a pincer which includes a pair of flexible beams that curve towards each other and define a facing direction.

FIG. 5e shows a stylized top view of a pincer [30] which includes a pair of flexible beams [33a] and [33b] that curve towards each other and preferably abut at their tips and define a facing direction, which is a direction parallel to the flat strip section of a contact or terminal of the invention, and the facing direction proceeds from the straight sections of the cantilever beams towards their tips. Arrow [29] illustrates a "facing direction" for the pincer, which in this illustration faces rightwards.

Figure 5F:
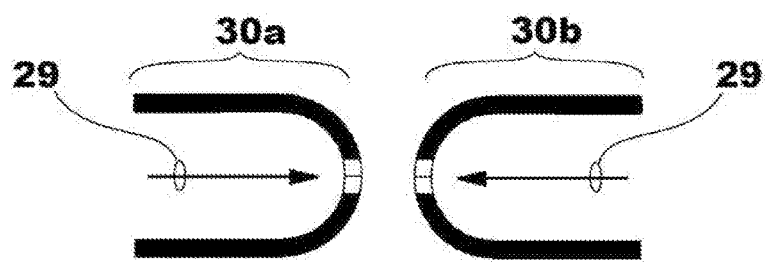
FIG. 5f shows a stylized top view of a pair of pincers that face towards each other.

FIG. 5f shows a stylized top view of a pair of mutually opposed pincers [30a] and [30b] that face towards each other. Each pincer has its own pair of flexible beams. The tips of the pincer beams also curve towards each other and preferably touch each other with a pinching preload. The facing directions of the pincer pairs are shown by arrows [29] and the arrows face towards each other. This pair of pincers cooperate so that a wire inserted into both pincers would be axially immobilized.

Figure 5G:
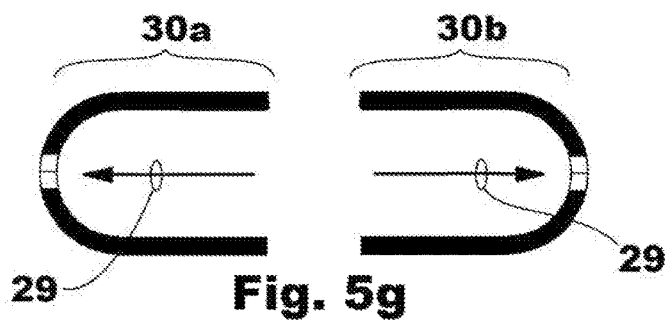
FIG. 5g shows a stylized top view of a pair of pincers that face away from each other.

FIG. 5g shows a stylized top view of a pair of mutually opposed pincers that face away each other. Each pincer has its own pair of flexible beams. The tips of the beams in the pincers curve towards each other and preferably touch each other with a pinching preload. However, the facing directions of the pincer pairs shown by arrows [29] face away from each other. This pair of pincers also cooperate so that a wire inserted into both pincers would be axially immobilized.

Figure 6A:
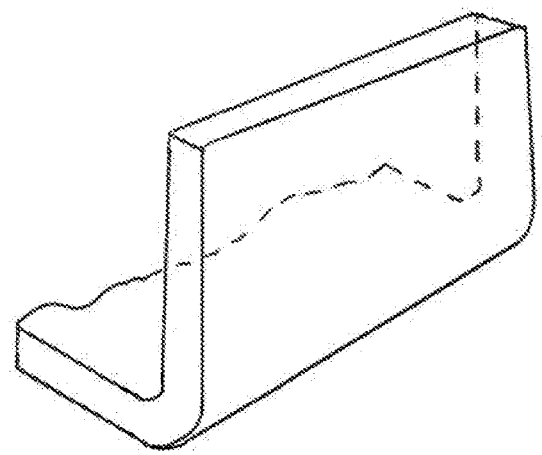
FIGS. 6a, 6b, and 6c illustrate a stiffening pocket or rib embossed or indented into an angle or channel portion of a stamped and formed contact in accordance with the invention.
Figure 6B:
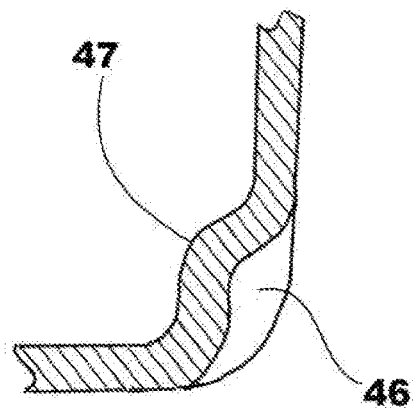
Figure 6C:
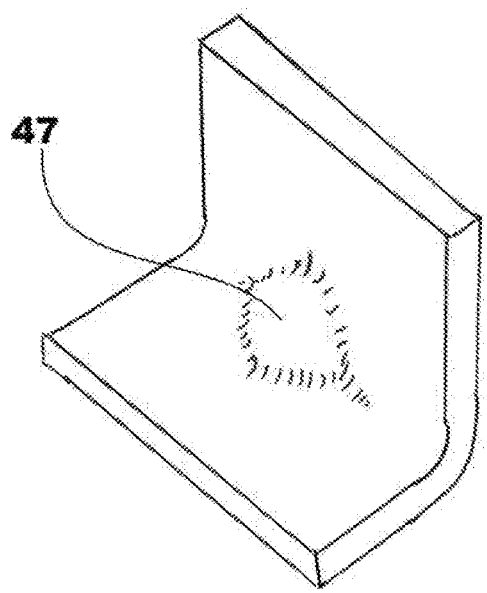

FIGS. 6a, 6b, and 6c illustrate a stiffening pocket or rib embossed or indented into an angle or channel portion of a stamped and formed contact in accordance with the invention. The dihedral of an angle or a channel as depicted in FIG. 6a is more resistant to downward bending than a flat strip of material, because of its greatly increased section modulus contributing to the sectional strength. However, some bending conditions allow the angle of such a channel section to unfold, reducing its sectional strength and precipitating a buckling failure of such a component. Sectional strength can be preserved by including stiffening ribs that tie one leg of the angle channel to the other to prevent the angle from unfolding at its crease. In small stamped and formed sheet metal work such as in the manufacture of electrical terminals, fully formed stiffening ribs are often impractical to create.

As seen in cross-section FIG. 6b, substantial increases in strength against buckling may be achieved by indenting a pocket [46] from the anhedral side of the folded edge of a channel and allowing an inward bulge [47] or boss to form within the dihedral side of the channel. The additional strength is gained not only in section modulus and resistance to unfolding of the crease of the channel section, but also from work hardening of the material local to this feature. FIG. 6c. depicts the boss [47] as seen from the inside or dihedral side of the channel section.

Figure 7A:
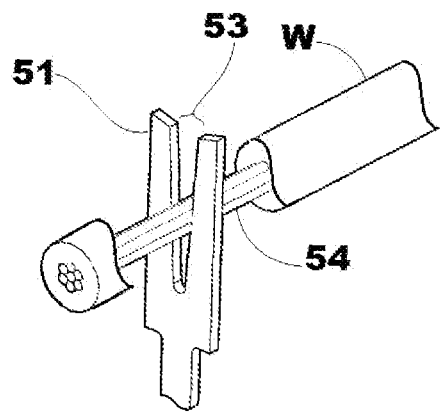
FIG. 7a shows a tuning fork style IDT contact receiving wire conductors into a rigid slot.

FIG. 7a shows a tuning fork style IDT contact [51] receiving wire conductors into a rigid slot [53.] Although insulation displacement connections are made with the wire jacket substantially in place except at the immediate vicinity of the contact where it is lacerated to reveal its conductors, in this figure and others to follow the wire [W] is shown with the jacket stripped and pulled away so that the interaction between the contact and the bundle of conductive strands [54] of the wires can be seen. In practice unstripped wires may be inserted directly into the pincer IDT section and the pinching edges of the flexible beams will lacerate the jackets, and expose and form gas-tight contacts with the conductive strands of the wires.

The typical tuning fork IDT contact slices through the wire jacket by its tines. The tuning fork presents a deep 'V' slot which is substantially rigid. As the wire is forced into the slot, plastic deformation of the conductor bundle occurs and permanent electrical connections are made by localized swaging of the strands. For best retention and for minimum insertion force, the walls of the V slot are made as vertical as possible. However, this arrangement of nearly parallel contact surface is not compliant, that is, unlike a wire trapped within a pincer of the invention, if the wire bundle shifts during service or vibration and becomes any more compact than its original configuration at the time of install, the tines of the tuning fork cannot clamp the bundle together enough to retain the original contact force. Contact resistance and electrical reliability of an interconnection is generally related to contact normal force and especially forces acting perpendicular to the surface of a conductor, which is called contact normal force. A severe disadvantage of an open slot design is that contact normal force, which is a clamping or pinching force perpendicular to the conductive surfaces in contact with each other, drops precipitously if the inserted wire strands come loose from each other and loosen from the sidewalls of the slot. Thus, like other rigid slot or open slot designs, in the tuning fork connector short term or long term rearrangement of the wire conductors seriously degrades contact reliability in any environment other than mild applications such as office computer equipment and server rooms which tend to experience limited temperature extremes, air circulation mostly free of contaminants, and only mild vibration such as from nearby fans, and infrequent physical shock.

Figure 7B:
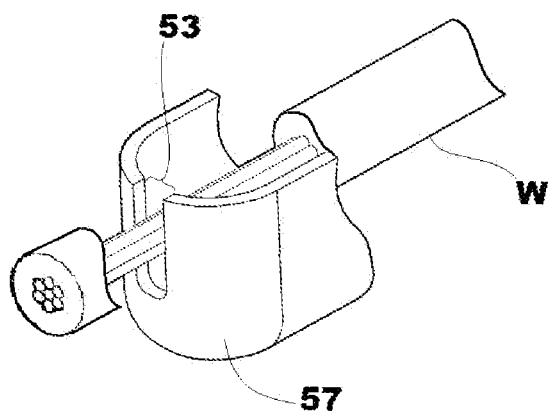
FIG. 7b shows a "boat" style IDT contact receiving wire conductors into a rigid slot.

FIG. 7b shows a "boat" style portion [57] of an IDT contact receiving wire [W] conductors into a rigid slot [53.] This figure shows the wire with a portion of the jacket stripped and pulled away so that the interaction between the contact and the bundle of conductive strands of the wire can be seen. Hass discloses a rigid boat style contact in which a wire bundle received therein is plastically deformed to produce a cold-forged connection (Column 3, lines 59-62.) The Hass "boat" has a continuous arcuate wall of material, supported from beneath, into which a slot is cut partway down for receiving the wire. Like the tuning fork whose tines are materially connected beneath the gap which receives the wire, the Hass slot is substantially rigid, and can only reliably receive a narrow size range of wire for it to perform effectively. A rigid slot contact may also be called an "open slot" contact, and normal force generated and maintained by such contacts primarily arises from stress retained in the side walls of the contact.

The limited acceptable size range of open or rigid slots restricts the use of any particular tuning fork design or boat design to only accept a narrow range of wire sizes, typically within only one A.W.G. gauge number. Thus a rigid slot contact designed to accept a 16AWG to 18AWG wire typically can neither effectively retain wires of 20AWG and smaller, nor of 14AWG wire and larger. A connector containing multiple wires sizes outside of such a narrow range would require several contact designs, each having uniquely assigned part numbers to prevent confusion and malfunction when the wrong size wire is inserted. Quality control documentation, inventorying, and lot traceability costs multiply with each additional line item added to an assembly bill of material.

Figure 7C:
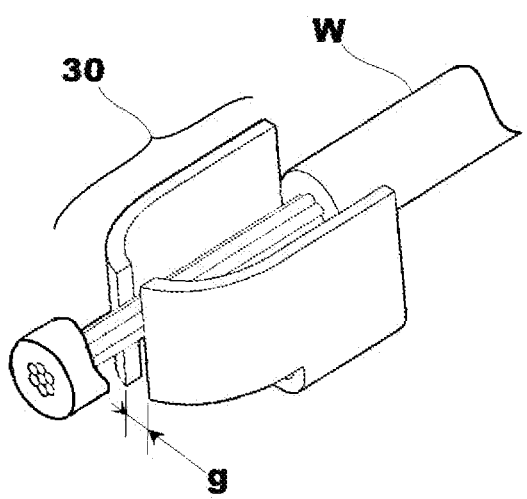
FIG. 7c shows a portion of wire received into a portion of an embodiment of an inventive IDT contact comprising a pair of flexible, arcuate pincer beams.

FIG. 7c shows a portion of wire [W] received into a portion of an embodiment of an inventive IDT contact comprising a pair of flexible, arcuate pincer beams [30.] This figure shows the wire with a portion of the jacket stripped and pulled away so that the interaction between the contact and the bundle of conductive strands of the wire can be seen. Because the beams of the pincer are free to move apart or pinch together, insertion of the wire spreads the beams apart to form a gap [g] within which the bundle of wire conductors are clamped or pinched.

This contact design may also be called a "pincher" or "pincer" IDC termination, and also a "closed slot" design. Unlike with an open slot design, installing a wire into a closed slot terminal is a parallel electrical conductor wire termination event starting with a closed slot position which becomes forced open as conductor core strands fill in between and spread the spring loaded contacts apart. The wire conductors experience lateral compression and swaging from the first introduction of a conductor into the closed pair of pincer beams, and lateral pinching force is maintained over the entire service life of the contact. In contrast, terminating an open slot position involves filling an open gap with conductor core strands until the width of the gap is full, and only thereafter does additional insertion force create lateral swaging of the conductors. More swaging is beneficial in establishing a permanent electrical interconnection because, like more contact wipe length, swaging displaces external oxide films which accrue upon conductive metal surfaces and exposes fresh clean metal. Maintaining contact normal force over time crushes adjacent clean metal surfaces together and prevents oxide films from growing between clean mated metal surfaces. A contact which excludes such oxide growth over its service life is called a "gas tight contact."

The inventive IDT contact is a closed slot design exhibiting superior performance over open slot designs. The open slot is seen in FIG. 3 of Hass. Other open slot designs are seen in U.S. Pat. No. 3,867,005 to Hoppe, FIG. 6 near the end of leader line for [84,] and in U.S. Pat. No. 4,385,794 to Lucius, FIG. 2 item [42,] and also in U.S. Pat. No. 4,648,679 to Pelczarski, FIG. 1 item [38.] Because all of these features are designed to be rigid, wedge-shaped gaps which begin receiving conductors into an open slot, none of these designs supply a teaching, suggestion, or motivation to consider using a spring-loaded, closed slot design such as the inventive pincers which comprise flexible beams having arcuate portions which curve towards each other to abut and form a spring-loaded closed slot. This improvement over the open-slot designs mentioned above offers the capability of terminating a wider range of wire sizes without changing the IDT design.

Figure 7D:
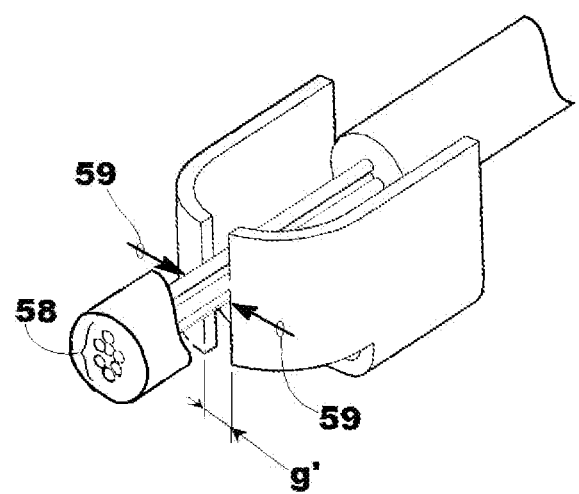
FIG. 7d shows the portion of wire received into the inventive IDT contact of FIG. 7c, but with the arrangement of connected wire strands having been degraded after service in a harsh environment.

FIG. 7d now shows the portion of wire received into the inventive IDT contact of FIG. 7c, but with the arrangement of connected wire strands [58] having been degraded after service in a harsh environment. This figure shows the wire with a portion of the jacket stripped and pulled away so that the interaction between the contact and the bundle of conductive strands of the wire can be seen. Even when a wire is stabilized elsewhere such as by a jacket crimp, in a harsh environment combining vibration, mechanical shocks, and thermal cycling the conductive strands within a solderless mechanical joint may shift and rearrange themselves. A rigid slot contact is unable to compensate for this rearrangement, which may often result in a precipitous loss of contact normal force, resulting in electrical unreliable events such as loss of signal integrity, intermittent disconnection, random surges in contact resistance, and even arcing.

Figure 7E:
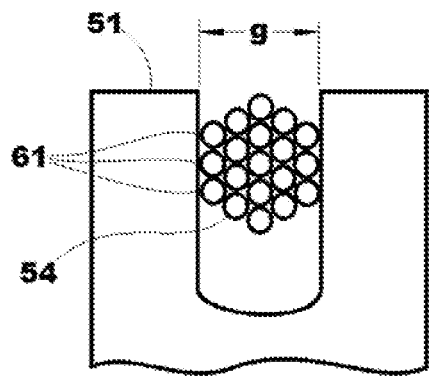
FIG. 7e shows an end view of a bundle of wire strands received into a rigid slot IDT contact.
Figure 7F:
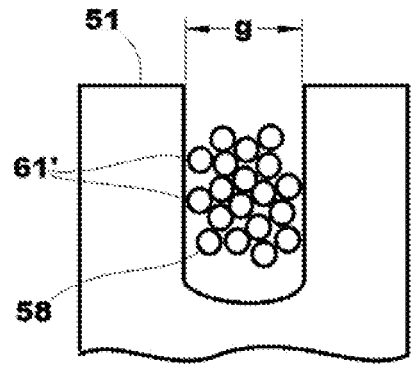
FIG. 7f shows an end view of the bundle of wire strands received into the rigid slot IDT contact of FIG. 7e, after having been degraded from service in a harsh environment.

FIGS. 7e and 7f illustrate this loss of connection integrity. FIG. 7e shows an end view of a bundle of wire strands [54] received into a rigid slot IDT terminal [51.] At first install, individual strands remain orderly and their contact areas [61] with the sidewalls of the slot are both numerous and well-formed. The slot has a gap width [g] into which the wire bundle is received.

FIG. 7f shows an end view of the bundle of wire strands received into the rigid slot IDT terminal of FIG. 7e, after having been degraded from service in a harsh environment. The cold-forged joints between strands in the degraded wire bundle [58] and the sidewalls of the slot have come apart. Because the sidewalls of the slot are materially connected beneath the wire bundle, the rigid slot remains spaced apart at a gap width [g] and cannot compensate for nor counteract the loss of interconnection integrity.

Both FIG. 3 and FIG. 9 of Hass show a material connection beneath the sidewalls of the Hass rigid slot (item [14] in Hass FIG. 3) so like the situation of FIGS. 7e and 7f above, the Hass contact also lacks flexible beams and the entire Hass specification is silent regarding pinching of a wire between freely movable flexible beams.

Figure 7G:
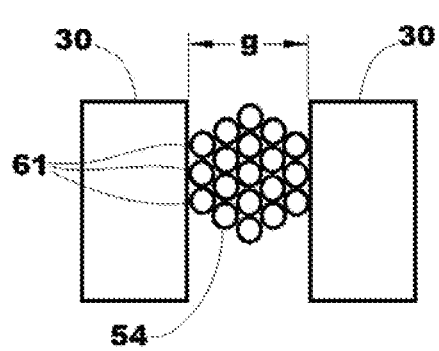
FIG. 7g shows an end view of a bundle of wire strands received between a pair of flexible, arcuate pincer beams of an IDT contact in accordance with the invention.

In contrast, FIG. 7g shows an end view of a bundle of wire strands [54] received between a pair of flexible, arcuate pincer beams [30] of an IDT contact in accordance with the invention. The tips of the beams pinch the strands of the wire bundles at numerous points [61] and the effective diameter of the wire bundle splays the flexible beams apart to a gap width [g.]

Figure 7H:
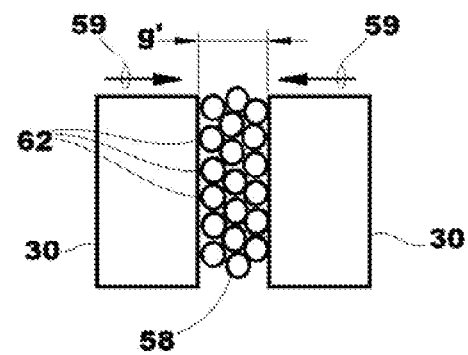
FIG. 7h shows an end view of the bundle of wire strands received into the inventive IDT contact of FIG. 7g, with the pincers closing and maintaining contact despite the arrangement of connected wire strands having been degraded after service in a harsh environment.

FIG. 7h shows an end view of the bundle of wire strands [58] received into the inventive IDT contact of FIG. 7g, but which have been addled and degraded after service in a harsh environment. However, unlike the rigid slot designs, the freely movable and flexible pincer beams [30] are pre-loaded and maintain a pinching contact force by continually compressing the rearranged wire bundle, and maintain numerous contact zones [62] or establish new contact sites on strands not previously available. The compressed conductive bundle has become narrower, but the flexible beams close upon it (motion arrows [59]) as the gap narrows from [g] of FIG. 7g to [g'] of this figure.

Thus the flexible beam pincers of the invention remain fully compliant because the beams may begin their adjustment upon the initial insertion of any conductive core or strand during assembly, and may adjust to reliably maintain normal force over the service life of the contact even if a wire bundle were to degrade to a configuration of single strands stacked one on one on top of each other. This capability of continually adjusting to wire strand movement over time is especially advantageous in harsh service environments which include temperature extremes, thermal shocks or mechanical shocks and vibrations, including automotive, marine, construction, military, aviation, and space environments.

Figure 7I:
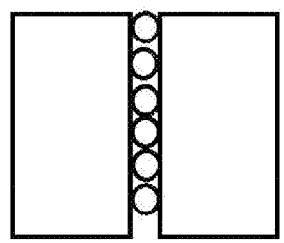
FIG. 7i shows an end view of a six-strand wire bundle received between a pair of flexible, arcuate pincer beams of an IDT contact in accordance with the invention, in which the wire bundle has been degraded to a linear vertical array of wire strands caught between the pincer contacts.

FIG. 7i shows an end view of a six-strand wire bundle received between a pair of flexible, arcuate pincer beams of an IDT contact in accordance with the invention, in which the wire bundle has been degraded to a linear vertical array of wire strands caught between the pincer contacts. Acceptable contact normal force and gas-tight contact conditions are maintained even in this extreme case. Rigid slot or open slot designs are unable to effectively adapt in the manner illustrated.

Figure 8:
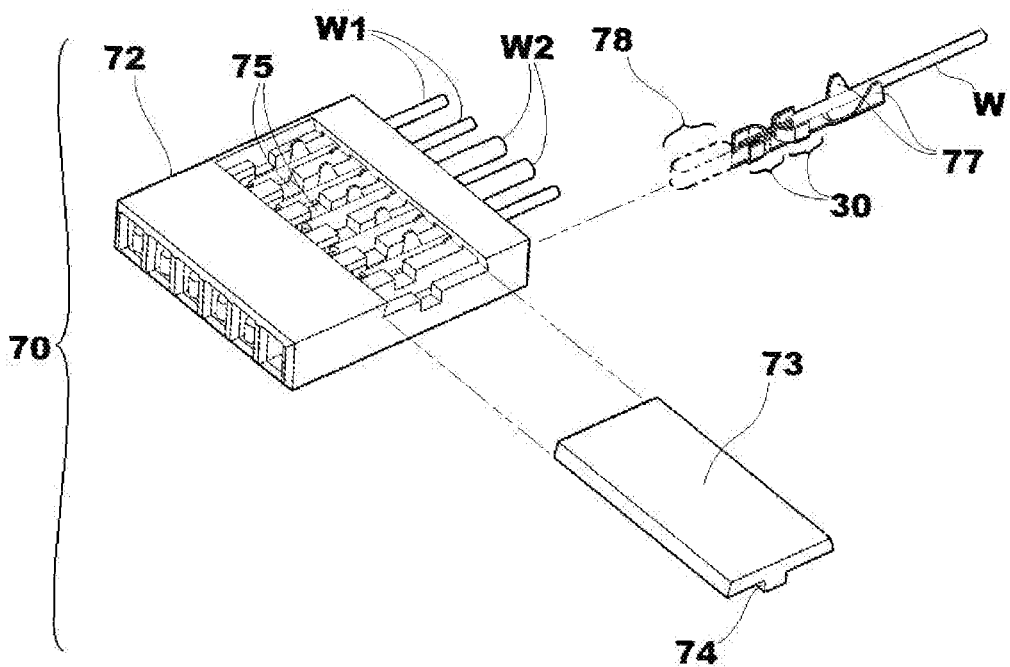
FIG. 8 depicts a cable end connector assembly having terminals in accordance with the invention, an insulator housing, and a terminal keeper bar.

FIG. 8 depicts a cable end connector assembly [70] having terminals in accordance with the invention, a cable end insulator housing [72,] and a terminal keeper bar [73.] Each terminal includes flexible beam pincer sections [30] for receiving a wire [W,] and jacket crimp wings [77.] The terminal end [78] may incorporate end configurations such as pin-receiving "duck bill" pairs of beams, formed rolled pins, or other common configurations, so in this and following figures it is shown as a broken-line feature because the exact details of these terminal ends are not specifically within the scope of the invention. The cable end connector is includes wires of different sizes [W1, W2,] which are advantageously received into the same size terminal, because a terminal in accordance with the invention is capable of receiving a wider range of wire sizes than the rigid slot designs discussed previously. Also, although adequate retention force is designed into connector assemblies, for some automotive applications a keeper is a specified requirement as a redundant safety means to prevent inserted terminals from being pushed out the back of the insulator housing when it is plugged in to a complementary mating device such as a shrouded header (not shown.) One effective keeper bar as shown in this figure includes a transverse ridge [74] which slides into a transverse slot [75] in the insulator housing which in this example extends behind the pincers of the terminals when they are fully inserted. Once the keeper bar is installed the terminal cannot be pulled out of the connector insulator housing, and typically the design is robust enough that as in FIGS. 5c and 5d the wire will part before the terminal can be dislodged from the insulator housing. Some designs even have more than one keeper bar, or a redundant keeper lock to prevent a keeper bar from slipping out of the connector insulator housing.

Figure 9A:
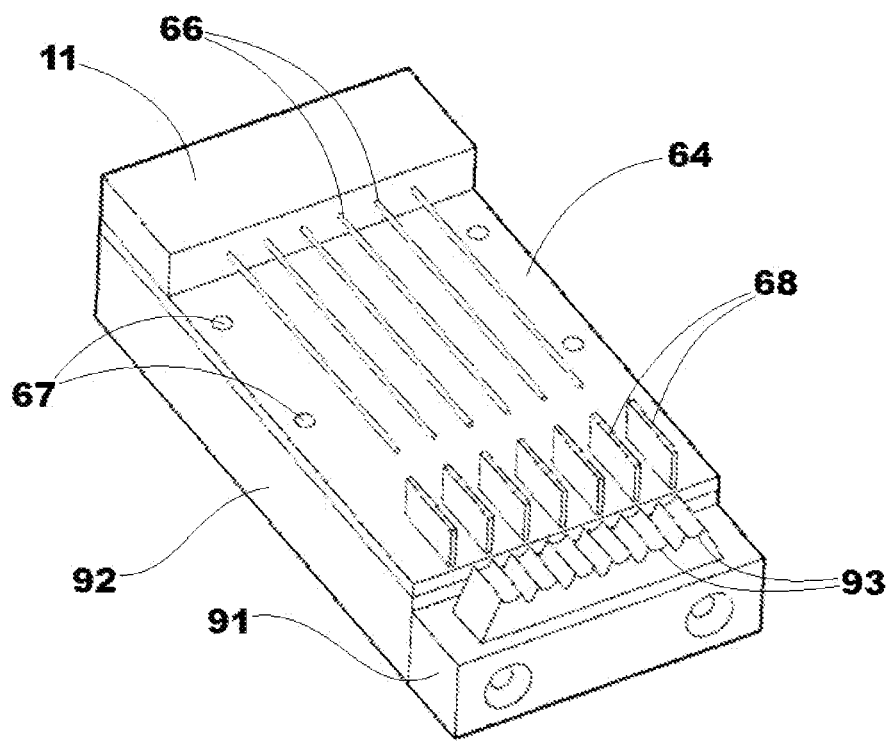
FIG. 9a shows a connector assembly fixture in accordance with the invention.

FIG. 9a shows a connector assembly fixture in accordance with the invention, designed for mass termination of insulation displacement termination (IDT) terminals and concurrent electrical testing. Assembly may begin with a connector insulator housing provided with partially inserted IDT terminals, or IDT terminals may receive wires into their flexible beam pincers, but not yet have their jacket crimp wings folded over to permanently capture their wires. The terminals may be arranged into slots defined between a linear array of parallel vanes [68] to stage them for insertion into a connector insulator housing. A header [11] affixed to an application specific assembly fixture [64] which includes a plurality of electrically conductive probes [66] which may be solid pins or may be spring-loaded 'pogo' pins or other axially compliant contacts or compliant cantilever contacts.

The application specific assembly fixture is made of a non-conductive material like plastic such as ABS, polycarbonate, polyethylene or nylon or other such plastics, and includes a linear array of spaced apart vanes [68] for receiving terminals between them and spacing them on a pitch complementary to the pitch of terminal-receiving apertures of a connector head shell. The application specific assembly fixture also includes an array of alignment holes [67] which receive pegs or pin features on a snap-on cover shown in other figures and discussed below. The engagement and alignment features operating between the application specific assembly fixture and the snap-on cover may be designed to provide either a light press fit, a transition fit, or a detent which may be felt by the user when the snap-on cover is fully and properly seated onto the application specific assembly fixture. An anvil tool [91] comprises a series of crimp forming sites [93] which control the rounded underside surface of the crimp wing section of terminals while these wings are being formed over to permanently secure each wire to its IDT terminal. The anvil tool preferably includes attachment means such as countersunk holes for screws to attach it securely to a rigid base [92] which is further secured to a work bench or other assembly surface of a work space. The application specific assembly fixture is also secured to this base.

Figure 9B:
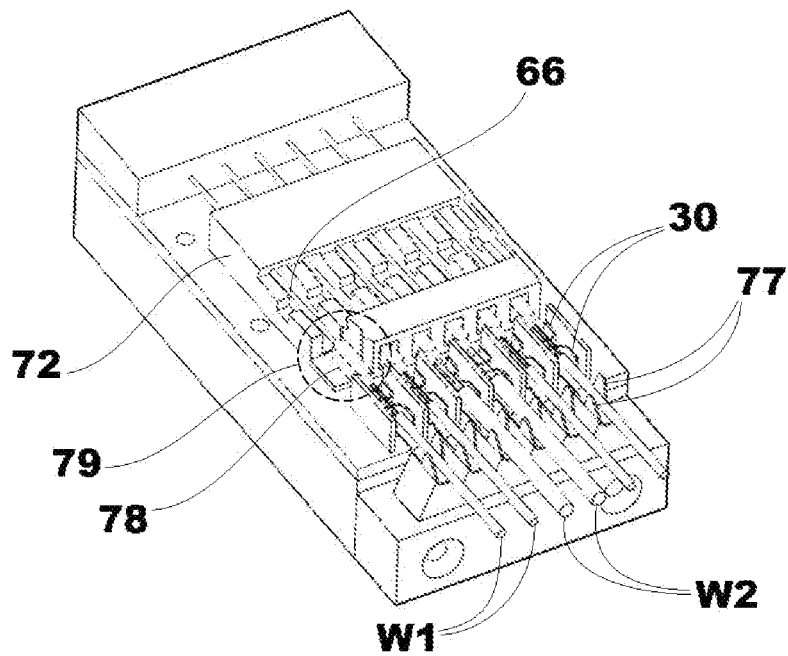
FIG. 9b shows a cable end connector assembly step wherein terminals may be electrically tested before being inserted into an insulator housing.

FIG. 9b shows a cable end connector assembly step wherein terminals may be electrically tested before being inserted into a connector insulator housing [72.] Several IDT terminals are shown having had wires inserted into their pairs of flexible pincers [30.] This figure shows how a single terminal design is able to accommodate different wire sizes [W1] and [W2.] At this assembly stage an IDT insertion tool (not shown) has pressed the wires into the pincer contact sections of the terminals, while these terminal sections were residing in the slots defined between the vanes of the application specific assembly fixture. The crimp wings [77] of the terminals have not yet been formed over to trap the wires which have been inserted into the pincer sections. Also in this view, the wires are shown with their insulation stripped in the vicinity of the pincer sections so as to illustrate their pinching effect and that the wire cores received by the pincers may vary in size and composition. In practice the pincers lacerate the jackets and make contact with the conductor strands or cores of the wire without it being necessary to strip or prepare the wire ends. Indeed, the very purpose of insulation displacement connectors is to eliminate the time and costs spent in wire end preparations such as stripping or tinning.

Inset [79] shows a portion of the connector insulator housing broken away to reveal the inventive IDT terminals staged but not fully inserted. The terminal end [78] or contact point is shown as a broken-line lozenge volume because the specifics of terminal end configurations are outside the scope of the invention. They may include many different contact interface designs, such formed rolled pins or duck-bill contacts for receiving header pins. In the assembly step show, the insulator housing has been positioned so that the test probe pins [66] pass through it, and the inventive IDT terminals are advanced enough so that their terminal ends are mated onto the probe pins. No snap-in, locking, press fit or force-fits of the terminals into the insulator housing have yet occurred at this step shown. As yet another time saving step, the insulator housing shown in this figure may be delivered to the assembly fixture with its set of IDT terminals already partially inserted so that retention features in the terminal may be partially engaged.

Figure 9C:
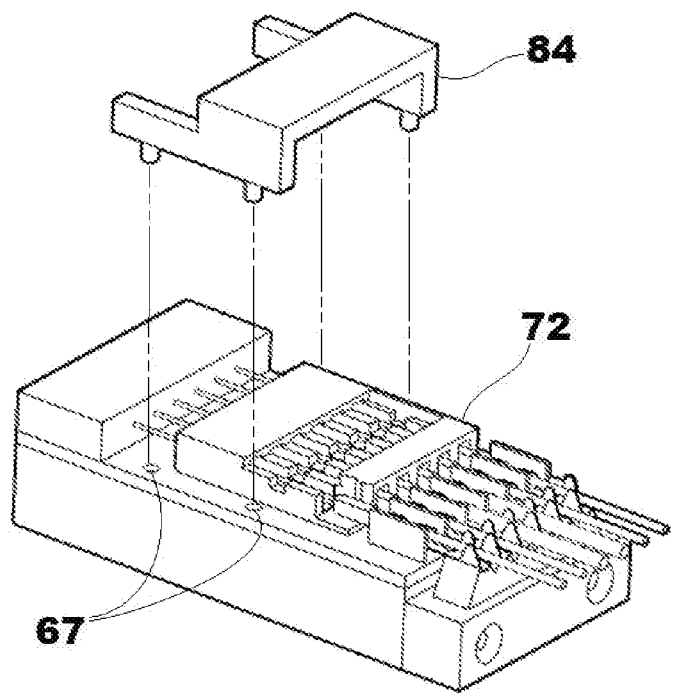
FIG. 9c shows a cable end connector assembly step wherein a snap-on cover is staged above a connector insulator housing.

In this figure and in FIG. 9c following, at least one of the plurality of electrically conductive probes resides within at least one of the terminal receiving apertures in the connector insulator housing. However, it is preferred that if all the probes are reasonably within the same length and all the terminals are inserted into the insulator housing to the same partial depth, then all the probes should be in good electrical contact with their terminals, especially when at least a portion of a terminal is received within a terminal receiving aperture in the connector insulator housing.

FIG. 9c shows a cable end connector assembly step wherein a snap-on cover [84] is staged above a connector insulator housing [72.] The snap-on cover has a surface for mating onto the application specific assembly fixture, and the mating surface includes pins or peg features on this surface complementary to an array of pin-receiving alignment apertures [67] in the application specific assembly fixture. The array of such apertures may be made asymmetrical to prevent the cover from being installed in any orientation except a correct orientation. In this figure the IDT terminals are seen received in slots defined by the linear array of parallel vanes of the application specific assembly fixture. The interior walls of the snap-on cover are complementary to the insulator housing so as to constrain the housing so that its terminal receiving apertures are also aligned with the terminal receiving slots of the application specific assembly fixture.

The electrically conductive probes of the header enter into the terminal receiving apertures of the cable end insulator housing so that by sliding the housing while it is constrained between the interior walls of the snap-on cover the array of terminals may be brought in to contact with the probe pins and electrical testing of the entire cable harness assembly may proceed before final terminations of either wires to terminals or final insertions of terminals into insulator housings has occurred. Often these final assembly steps are irreversible or difficult to undo, so a distinct advantage in labor savings is made available by allowing rework of individual terminations or minor assembly errors without having to scrap an entire terminated cable end insulator housing assembly or an entire wire harness assembly. It is also contemplated within the scope of the invention that the peg and hole alignment system between a snap-on cover and the application specific assembly fixture may be reversed so that some or all pegs reside in the application specific assembly fixture, and complementary holes for these pegs reside in the snap-on cover.

Figure 9D:
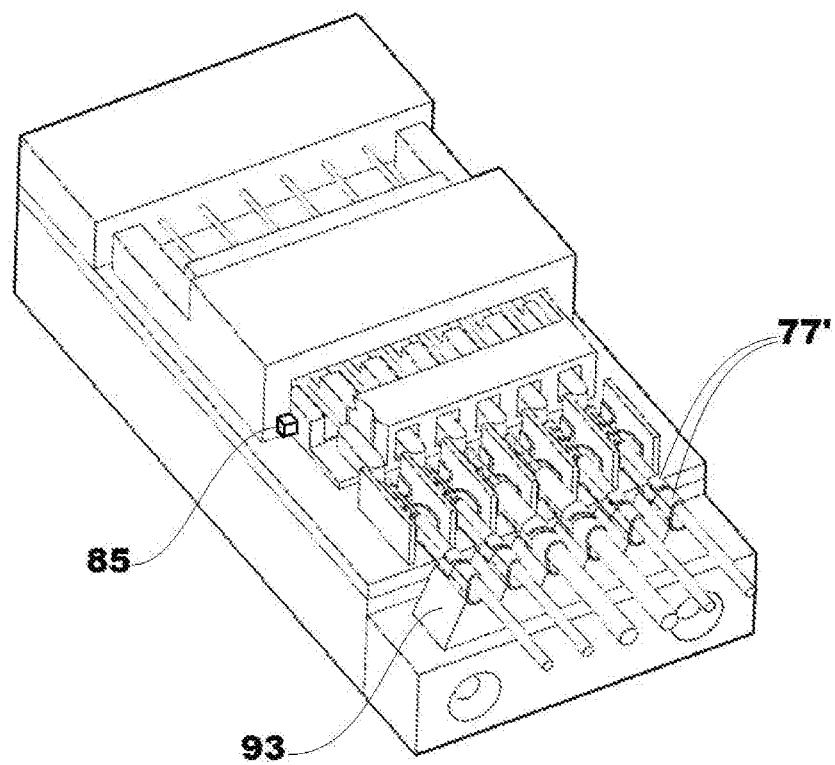
FIG. 9d shows a cable end connector assembly step wherein the snap-on cover of FIG. 9c is emplaced to enforce registration of the terminals to the receiving recesses in the insulator housing and to control depth of insertion of the terminals.

FIG. 9d shows a cable end connector assembly step wherein the snap-on cover of FIG. 9c is emplaced to enforce registration of the terminals to the receiving recesses in the insulator housing and to control depth of insertion of the terminals. In this figure the connector insulator housing includes at least one depth stop [85] which prevents the housing from sliding into the snap-on cover beyond a predetermined depth. If the results of electrical testing of the contacts are acceptable, then crimping of the crimp wings onto the wire jackets may proceed. This figure shows the crimp wings [77'] formed over in their permanent, assembled condition. The depth stop feature and the snap-on cover may also cooperate to enforce that the pincer IDT sections of the terminals are properly aligned within the vanes of the application specific assembly fixture and are ready for wire termination by the descent of the wire insertion tool discussed in FIG. 10, and may also enforce that the jacket crimp sections of the terminals are properly seated over the crimp forming sites [93] of the anvil tool.

Electrical tests may be performed concurrently during the assembly process anytime while the terminals are in contact with their test probes. An entire cable harness assembly may be tested and verified before irreversible assembly steps are taken. Note that the contacts still remain electrically mated with the test probe pins so that if desired, additional redundant electrical tests may further verify that the crimp process did not harm the terminals.

The advantage of being able to test and assure signal integrity before steps are taken which are difficult or impossible to undo and try again substantially reduces per unit cable costs by reducing or eliminating costly rework steps such as pulling and replacing a terminal which has been fully inserted into its insulator housing, especially for a design having retention features which must be defeated in order to extract it. Once signal integrity testing has qualified all terminals in the assembly as functional, the jacket crimp wings of the terminal may then be formed over [77'] to clamp and hold the wires as a redundant safety and electrical quality assurance feature. The array of contacts may then be pushed forward as a gang and mass-inserted into the insulator housing, and the depth stops maintain the housing in position until the proper terminal insertion depth is achieved. Even after full insertion, yet another redundant battery of electrical tests may further again that the terminal insertion process was successful. Because a redundant series of electrical tests may be repeated at each process step, loss of control of quality of any individual step may be detected and corrected quickly.

A summary of a set of possible assembly steps enabled by the inventive contact and terminal design is:
(a) providing a connector assembly fixture comprising:
   a base, and an application specific assembly fixture secured to the base which further comprises an array of alignment apertures and a linear array of parallel vanes which define terminal receiving slots,
   a header affixed to the application specific assembly fixture, with the header further comprising a plurality of electrically conductive probes, and
   a snap-on cover comprising a surface for mating to the application specific assembly fixture, with the mating surface of the snap-on cover comprising a plurality of pins complementary to the array of alignment apertures in the application specific assembly fixture,
   with the snap-on cover further comprising interior walls complementary to a connector insulator housing to be received between them, so that terminal receiving apertures in the connector insulator housing become aligned with the terminal receiving slots defined between said vanes of the application specific assembly fixture,
(b) securing the connector assembly fixture to a work site and connecting the header to electrical diagnostic equipment,
(c) providing a connector insulator housing having terminal-receiving apertures,
(d) partially inserting a set of electrical terminals having pincer IDT sections further comprising:
   two flexible beam pincers, each pincer comprising
   two flexible beams each disposed on opposite sides of a flat strip section,
   each flexible beam having a straight section and an arcuate section, with a portion of each straight section attached to the flat strip section, and
   with the arcuate sections curving towards each other to abut at their tips under a preload, and forming a closed slot openable for receiving and retaining a wire inserted therein, so that the terminals are lightly retained within said terminal-receiving apertures of said insulator housing, and a jacket crimp wing, (e) positioning the connector insulator housing so that the electrically conductive probes in the header of the connector assembly fixture enter into and contact the electrical terminals, (f) registering and installing the snap-on cover onto the connector insulator housing and said connector assembly fixture so that the snap-on cover registers the connector insulator housing to the connector assembly fixture, (g) ensuring that the set of electrical terminals are aligned within the terminal-receiving slots between the parallel vanes of the connector assembly fixture, (h) arranging a set of wires onto the pincer IDT sections of the electrical terminals, (i) mass-terminating all of the set of wires into all of the pincer IDT sections of the set of electrical terminals, (j) advancing the set of electrical terminals so that they all contact and engage with the electrically conductive probes, (k) performing an electrical verification test, (l) verifying that all of the mass-terminated wires pass the verification test, (m) ensuring that the jacket crimps of the terminals are seated upon a set of crimp forming sites which are part of an anvil tool attached to the connector assembly fixture, (n) aligning a crimp forming tool over the jacket crimp wings of the electrical terminals and over the underside crimp forming tool, (o) mass-crimping all jacket crimps onto jackets of the wires, (p) fully inserting the set of electrical terminals into the terminal-receiving apertures in the connector insulator housing, and (q) removing the snap-on cover and removing the connector housing from the connector assembly fixture.

The phrase "lightly retained" in this assembly process refers to contacts inserted into a housing using an insertion force of less than 1 ounce of applied force, and that no substantial permanent deformation of the material of the connector insulator housing occurs. This assembly process may be performed on a connector having a set of terminals all of the same size, but receiving a set of wires comprising multiple wire sizes. As mentioned above, optional redundant electrical testing may be repeated after steps (n) or (o.) For connector designs including a keeper bar, the keeper bar may be inserted as a step following stem (p.) Electrical verifications tests may include any one or a suite of tests such as: an electrical continuity test, a cross-talk test, a dielectric withstanding voltage test, an electrical current withstanding test, a contact resistance test, a test to detect an electrical short circuit, and a time domain reflectometry test.

Since the connector assembly fixture remains secured to the workbench, assembly of the next cable end connector may begin at step Also, besides ease of rework, since each version of the inventive IDT contact is able to receive a wider gauge range, mass wire termination of a wider mix of wire gauges into a connector body offers a primary cost advantage compared to any other individual wire termination design where an assembler must first, fully terminate the connector contact and then second, insert the terminated contact into a hole position in a connector insulator housing.

FIG. 10 shows an IDT insertion tool [88] for terminating wires to contacts in accordance with the invention. The tool includes vertically spring-loaded side bars [87] at both its ends to provide lateral stability to the vanes [68] which register the array of terminals so that they are on-pitch regardless of core size or conductor size. Additional lateral locking features may be included to prevent the side bars from splaying apart laterally. The side bars bottom out onto the surface of the application specific assembly fixture [64] first and then stop descending, while the rest of the insertion tool continues to push the set of wires down to complete the insertion process. During the insertion and termination process the flexible beams of the pincers may operate independently, especially when wires having a diversity of wire core diameters are being received for termination. This is accomplished by controlling the width dimension [x] taken from the outer edge of the first vane and spanning across to the outer edge of the last vane of the application specific assembly fixture installed in the work space. The distance between the inner surfaces of the two spring-loaded side bars equals this 'x' dimension. The spring-loaded side bars also preferably include chamfers or lead-in features to capture the outermost vanes during the descent of the insertion tool, and prevent damage such as stubbing or crushing these vanes.

The application shown included mixed wires sizes [W1] and [W2] which are all received into a single design and size of the inventive IDT terminal. The wires are assembled on a contact pitch [p] and a common value for p is 0.156 inches. Maintaining the wires on a common pitch also prevents and undesired situation where a wire is received laterally offset within a pincer, with one beam of the pincer deflected much more than the other. Generally, the symmetrical design of a pincer will create a restoring force in which the heavier stressed beam pushes the wire back to a central position in which the mutually opposed pinching forces in the two flexible beams of a pincer equalize themselves.

The integrity and consistency of the wire termination process that provides free movement of these two compliant cantilevers is maintained by the applicator tool which applies a controlled, measured vertical force to the wire or wires during this process. Also of note, no side-action tooling is required to complete the termination process. Instead, by securing the sidewalls of the flexible beam pincers by means of the vanes and the side bars of the insertion tool, the flexible beams may operate independently and adjust to whatever size wire is being received and may also, during insertion or at any time in service, adjust to any rearrangement of a conductive bundle over time.

Figure 11:
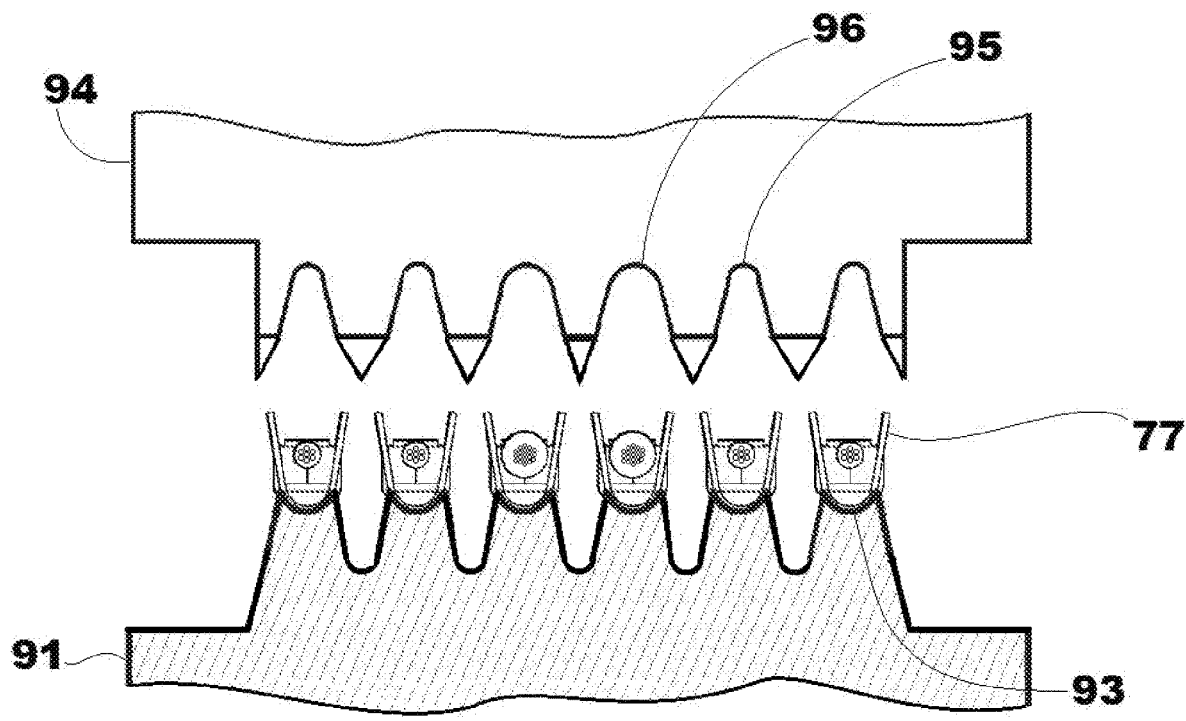
FIG. 11 shows a set of forming tools for closing crimp wings onto wire jackets of an array of wires held within a connector assembly fixture in accordance with the invention.

FIG. 11 shows a set of forming tools for closing crimp wings [77] onto wire jackets of an array of wires held within the application specific assembly fixture (not shown) in accordance with the invention. The tools preferably include an anvil tool [91] comprising a series of crimp forming sites [93] which control the rounded underside surface of the crimp wing section while the wings are being formed. An upper-side tool which is a crimping punch [94] includes downwardly open arch features [95, 96] which are sized to the crimp wings and the final diameter of a wire jacket crimps when they are squeezed all shut between the anvils and overhead arches, which curl the wings down and around the wire jackets.

FIG. 12 shows a set of the inventive IDT wire terminals resting on a portion of the inventive connector assembly fixture. The terminals are all the same size but each receives and connects to a wire of a different size [W1, W2, W3, W4.]

Compared to the range of wire sizes able to be grasped by a rigid slot design, the flexible beam pincers shown in this figure widen the range of acceptable sizes by extending its lower limit of acceptable sizes. As shown, a preferred design having two flexible beam pincers facing each other can handle roughly the same maximum wire gauge as a rigid slot terminal with the same feature dimensions, material composition and treatments, and material thickness, but it may successfully grasp and retain a smaller minimum wire gauge. One such wire pincer design can grip wires within the gauge range of 14AWG-24AWG in a single contact. "AWG" is an abbreviation for "American Wire Gauge." The phantom lines show where the tips of the cantilever beams of the wire pincers have bitten through the wire jacket and have clamped onto the conducive strands of the wire. [W1] is a small, solid wire having a single strand. The larger wires [W2, W3, W4] have multiple strand wire cores.

The assembly process described previously may be performed to terminate a set of wires having conductive cores of more than one diameter, and in most cases within a wide range of diameters Thus the set of wires mentioned in step (h) of the process above may comprise wires of a first conductive core diameter $[B_1]$ and wires of a second conductive core diameter $[B_2]$ at least 20% smaller than the first conductive core diameter. For example, a single contact design in accordance with the invention may accept 22AWG wire which has a conductive core diameter of about 0.0201 inches, and also accept 24AWG wire which has a conductive core diameter of about 0.0201 inches, or about 20 percent smaller. It is nearly impossible to fashion a Hass-type contact, a tuning fork contact or other rigid, open slot contact design to be capable of reliably receiving wire of a first conductive core diameter, and then use the exact same contact design to receive wire of a second conductive core diameter 20 percent smaller than the first, while having the same contact design behave with equal reliability and endurance in equivalent field conditions such as an automotive environment, because the material connecting the sidewalls of the slot prevents the open slot from closing down and maintaining a strong enough pinch on the conductors to preserve a reliable electrical interconnection. In other words, a contact may be designed in accordance with the invention so that it is able to accept a first wire conductive core diameter like 22AWG, and then the same contact can also bite down properly onto 24AWG, and in both cases its pincers can keep a good bite going even if the conductive strands within the wire rearrange themselves over time. Open slot contacts cannot deliver this kind of performance or long-term reliability.

Proper insertion depth as shown by dimension 'd' is the same for all wire sizes, so the same insertion tooling may be used for all wire sizes and advantageously allows mixed wire-size termination available within a single connector insulator housing. Thus the invention simplifies and reduces the types of tooling kept on hand at a cable assembly work station, and reduces inventory cost, process complexity, time spent for tooling changeovers, and reduces the opportunities for error and rework or scrapped material.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise.

Consequently and in summary, although many exemplary embodiments are described above, it will be appreciated that the invention is intended to cover all modifications and equivalents within the scope of the following claims.

What is claimed is:

1. An insulation displacement termination (IDT) electrical contact comprising
    a flat strip section, and
    two flexible beam pincers, each of said pincers comprising
        two flexible beams, with each flexible beam disposed on opposite sides of said flat strip section,
        each flexible beam having a straight section and an arcuate section, with a portion of each straight section attached to said flat strip section, and
        with said arcuate sections curving towards each other to abut at their tips under a pinching preload, and forming a closed slot openable for receiving and retaining a wire inserted therein,
    wherein each flexible beam pincer defines a facing direction proceeding parallel to said flat strip section from said straight sections of said two flexible beams to said tips of said two flexible beams, and
    wherein said facing direction of a first of said two flexible beam pincers is opposed to a facing direction of a second of said two flexible beam pincers.

2. The insulation displacement termination (IDT) electrical contact of claim 1, with said flexible beam pincers oriented facing each other.

3. The insulation displacement termination (IDT) electrical contact of claim 1, with said flexible beam pincers oriented facing away from other.

4. The electrical insulation displacement termination (IDT) electrical contact of claim 1, wherein said closed slot further comprises a notched lead-in.

5. The insulation displacement termination (IDT) electrical contact of claim 1, wherein said arcuate sections of said flexible beams of a pincer are concentric and together form a semi-circular arc.

6. The insulation displacement termination (IDT) electrical contact of claim 1, wherein a retention force in said at least one of said two flexible beam pincers equals at least an ultimate tensile strength of said wire.

7. A connector assembly fixture for mass termination of insulation displacement termination (IDT) terminals and concurrent electrical testing, comprising:
    a base,
    an application specific assembly fixture secured to said base, said application specific assembly fixture further comprising
        an array of alignment apertures and
        a linear array of parallel vanes which define terminal receiving slots, a header affixed to said application specific assembly fixture, said header further comprising a plurality of electrically conductive probes for electrical contact with terminals deposited within said terminal receiving slots, and a snap-on cover comprising a surface for mating to said application specific assembly fixture, said surface comprising a plurality of alignment pegs complementary to said array of alignment apertures, and interior walls complementary to a connector insulator housing received between said interior walls of said snap-on cover, such that terminal receiving apertures in said connector insulator housing are aligned with said terminal receiving slots.

8. The connector assembly fixture of claim 7, wherein at least one of said plurality of electrically conductive probes resides within at least one of said terminal receiving apertures in said connector insulator housing.

9. The connector assembly fixture of claim 8, wherein at least one of said plurality of electrically conductive probes is in electrical contact with a terminal.

10. The connector assembly fixture of claim 8, wherein at least a portion of said terminal is received within one of said plurality of terminal receiving apertures in said connector insulator housing.

11. A process for assembling an electronic connector comprising:

(a) providing a connector assembly fixture comprising:

A base, and an application specific assembly fixture secured to said base, said application specific assembly fixture further comprising an array of alignment apertures and a linear array of parallel vanes which define terminal receiving slots, a header affixed to said application specific assembly fixture, with said header further comprising a plurality of electrically conductive probes, and a snap-on cover comprising a surface for mating to said application specific assembly fixture, with said mating surface of said snap-on cover comprising a plurality of pins complementary to said array of alignment apertures in said application specific assembly fixture, said snap-on cover further comprising interior walls complementary to a connector insulator housing to be received between them, so that terminal receiving apertures in said insulator housing become aligned with said terminal receiving slots defined between said vanes of said application specific assembly fixture, (b) securing said connector assembly fixture to a work site and connecting said header to electrical diagnostic equipment, (c) providing a connector insulator housing having terminal-receiving apertures, (d) partially inserting a set of electrical terminals having pincer IDT sections further comprising:

two flexible beam pincers, each pincer comprising two flexible beams each disposed on opposite sides of a flat strip section, each flexible beam having a straight section and an arcuate section, with a portion of each straight section attached to said flat strip section, and with said arcuate sections curving towards each other to abut at their tips under a preload, and forming a closed slot openable for receiving and retaining a wire inserted therein, so that said terminals are lightly retained within said terminal-receiving apertures of said insulator housing, and a jacket crimp wing, (e) positioning said connector insulator housing so that said electrically conductive probes in said header of said connector assembly fixture enter into and contact said electrical terminals, (f) registering and installing said snap-on cover onto said connector insulator housing and said connector assembly fixture so that said snap-on cover registers said insulator housing to said connector assembly fixture, (g) ensuring that said set of electrical terminals are aligned within said terminal-receiving slots between said parallel vanes of said connector assembly fixture, (h) arranging a set of wires onto said pincer IDT sections of said electrical terminals, (i) mass-terminating all of said set of wires into all of said pincer IDT sections of said set of electrical terminals, (j) advancing said set of electrical terminals so that they all contact and engage with said electrically conductive probes, (k) performing an electrical verification test, (l) verifying that all mass-terminated wires pass said verification test, (m) ensuring that said jacket crimp wings of said terminals are seated upon a set of anvils which are part of an underside crimp forming tool attached to said connector assembly fixture, (n) aligning a crimp forming tool over said jacket crimps of said electrical terminals and over said underside crimp forming tool, (o) mass-crimping all jacket crimps onto jackets of said wires, (p) fully inserting said electrical terminals into said terminal-receiving apertures in said connector insulator housing, and (q) removing said snap-on cover and removing said connector housing from said connector assembly fixture.

12. The process of claim 11, wherein said electrical verification test of step (k) is a first electrical verification test, and comprising the steps after step (o) of:

(o-1) performing a second electrical verification test, and (o-2) verifying that all mass-crimped wires pass said verification test.

13. The process of claim 11, wherein said electrical verification test of step (k) is a first electrical verification test, and comprising the steps after step (p) of:

(p-1) performing a second electrical verification test, and (p-2) verifying that all mass-crimped wires pass said verification test.

14. The process of claim 11, wherein said electrical verification test of step (k) is a test selected from the set of tests consisting of:

an electrical continuity test, a cross-talk test, a dielectric withstanding voltage test, an electrical current withstanding test, a contact resistance test, a test to detect an electrical short circuit, and a time domain reflectometry test.

15. The process of claim 11, wherein said set of wires of step (h) comprises wires of a first conductive core diameter and wires of a second conductive core diameter at least 20 percent smaller than said first conductive core diameter.

* * * * *